US012452903B2

(12) United States Patent
Damnjanovic et al.

(10) Patent No.: US 12,452,903 B2
(45) Date of Patent: Oct. 21, 2025

(54) TECHNIQUES FOR DATA MULTIPLEXING BASED ON PACKET DELAY

(71) Applicant: QUALCOMM Incorporated, San Diego, CA (US)

(72) Inventors: Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 494 days.

(21) Appl. No.: 17/478,783

(22) Filed: Sep. 17, 2021

(65) Prior Publication Data

US 2023/0087091 A1    Mar. 23, 2023

(51) Int. Cl.
*H04W 72/20*     (2023.01)
*H04W 72/1268*   (2023.01)
*H04W 72/23*     (2023.01)
*H04W 72/566*    (2023.01)

(52) U.S. Cl.
CPC ..... *H04W 72/566* (2023.01); *H04W 72/1268* (2013.01); *H04W 72/20* (2023.01); *H04W 72/23* (2023.01)

(58) Field of Classification Search
None
See application file for complete search history.

(56) References Cited

U.S. PATENT DOCUMENTS

2018/0317123 A1*  11/2018  Chen ................... H04W 72/21
2019/0098657 A1*   3/2019  Golitschek Edler von Elbwart ...
                                              H04W 72/21
2019/0124015 A1*   4/2019  Loehr .................. H04L 5/0058
2019/0350045 A1*  11/2019  Lee ..................... H04W 80/02
2020/0275474 A1*   8/2020  Chen ................... H04L 1/1848
2021/0135928 A1*   5/2021  Yi ...................... H04W 72/21
2021/0144582 A1*   5/2021  Yi ...................... H04W 72/23
2021/0168826 A1*   6/2021  Zhao ................... H04L 5/0044
2022/0346112 A1*  10/2022  Lin .................... H04W 72/1263
2022/0361011 A1*  11/2022  Uusitalo .............. H04W 24/02
2022/0408294 A1*  12/2022  Lee .................... H04W 76/14

(Continued)

FOREIGN PATENT DOCUMENTS

WO    WO-2021163527 A1    8/2021

OTHER PUBLICATIONS

International Search Report and Written Opinion—PCT/US2022/040988—ISA/EPO—Dec. 9, 2022.

(Continued)

*Primary Examiner* — Kodzovi Acolatse
(74) *Attorney, Agent, or Firm* — Holland & Hart LLP/QUALCOMM Incorporated

(57) ABSTRACT

Methods, systems, and devices for wireless communications are described. A first device (e.g., a user equipment) may modify logical channel prioritization based on a packet delay. The first device may receive a set of parameter values for a logical channel prioritization procedure, then select a parameter value from the set based on a packet delay for data scheduled in an uplink grant. The first device may determine the parameter value, or the first device may select the parameter value based on signaling received from a second device (e.g., a base station). In some examples, the first device or the second device may determine the parameter value based on a delay prediction or machine learning.

43 Claims, 18 Drawing Sheets

(56) References Cited

U.S. PATENT DOCUMENTS

| | | | | |
|---|---|---|---|---|
| 2023/0189293 A1* | 6/2023 | Du | ............. | H04W 72/40 370/329 |
| 2023/0239793 A1* | 7/2023 | Lin | ............. | H04W 52/0216 370/311 |
| 2023/0292359 A1* | 9/2023 | Tesanovic | ............. | H04W 72/542 |
| 2023/0354352 A1* | 11/2023 | Pelletier | ............. | H04W 72/23 |

OTHER PUBLICATIONS

3GPP TS 38.321: "3rd Generation Partnership Project, Technical Specification Group Radio Access Network, NR, Medium Access Control (MAC) protocol specification (Release 16)", 3GPP Organizational Partners, Sophia Antipolis Valbonne, France, V16.5.0, Multiplexing and Assembly, Jun. 2021, pp. 49-52, Jun. 2021, 10 Pages, Section 5.4.3.

3GPP TS 38.331: 3rd Generation Partnership Project, Technical Specification Group Radio Access Network, NR, Radio Resource Control (RRC) protocol specification (Release 16), V16.5.0, 3GPP Organizational Partners, Sophia Antipolis Valbonne, France, pp. 443-446 and 788-790, 26 Pages, Jun. 2021.

* cited by examiner

TECHNIQUES FOR DATA MULTIPLEXING BASED ON PACKET DELAY

INTRODUCTION

The following relates to wireless communications, including techniques for data multiplexing for the wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a first device is described. In some examples, the method may include receiving, from a second device, control signaling indicating a set of parameter values associated with a prioritization procedure for a set of logical channels. In some examples, the method may further include receiving, from the second device, a grant scheduling a transmission of data. In some examples, the method may further include transmitting the data to the second device in response to receiving the grant, the data multiplexed according to a parameter value of the set of parameter values, the parameter value based on a packet delay associated with one or more logical channels of the set of logical channels.

An apparatus for wireless communications at a first device is described. The apparatus may include a processor and memory coupled to the processor. In some examples, the processor and memory may be configured to receive, from a second device, control signaling indicating a set of parameter values associated with a prioritization procedure for a set of logical channels. In some examples, the processor and memory may be further configured to receive, from the second device, a grant scheduling a transmission of data. In some examples, the processor and memory may be further configured to transmit the data to the second device in response to receiving the grant, the data multiplexed according to a parameter value of the set of parameter values, the parameter value based on a packet delay associated with one or more logical channels of the set of logical channels.

Another apparatus for wireless communications at a first device is described. In some examples, the apparatus may include means for receiving, from a second device, control signaling indicating a set of parameter values associated with a prioritization procedure for a set of logical channels. In some examples, the apparatus may further include means for receiving, from the second device, a grant scheduling a transmission of data. In some examples, the apparatus may further include means for transmitting the data to the second device in response to receiving the grant, the data multiplexed according to a parameter value of the set of parameter values, the parameter value based on a packet delay associated with one or more logical channels of the set of logical channels.

A non-transitory computer-readable medium storing code for wireless communications at a first device is described. In some examples, the code may include instructions executable by a processor to receive, from a second device, control signaling indicating a set of parameter values associated with a prioritization procedure for a set of logical channels. In some examples, the code may include instructions executable by a processor to receive, from the second device, a grant scheduling a transmission of data. In some examples, the code may include instructions executable by a processor to transmit the data to the second device in response to receiving the grant, the data multiplexed according to a parameter value of the set of parameter values, the parameter value based on a packet delay associated with one or more logical channels of the set of logical channels.

Some examples of the method, apparatuses, and non-transitory computer-readable medium described herein may further include operations, features, means, or instructions for receiving, from the second device, control signaling indicating the parameter value to be used for multiplexing the data corresponding to the set of logical channels, where an amount of data corresponding to a first logical channel of the set of logical channels may be transmitted in response to receiving the control signaling indicating the parameter value.

Some examples of the method, apparatuses, and non-transitory computer-readable medium described herein may further include operations, features, means, or instructions for transmitting, to the second device, a parameter modification request, where the control signaling indicating the parameter value may be received in response to transmitting the parameter modification request.

Some examples of the method, apparatuses, and non-transitory computer-readable medium described herein may further include operations, features, means, or instructions for determining the packet delay based on a delay prediction, where the data may be transmitted based on determining the packet delay.

Some examples of the method, apparatuses, and non-transitory computer-readable medium described herein may further include operations, features, means, or instructions for receiving, from the second device, control signaling indicating one or more delay parameters associated with data transmissions, where the delay prediction may be based on the control signaling indicating the one or more delay parameters associated with data transmissions.

In some examples of the method, apparatuses, and non-transitory computer-readable medium described herein, the delay prediction may be based on a current packet delay, a delay deadline, a backhaul delay, a processing delay, or any combination thereof.

In some examples of the method, apparatuses, and non-transitory computer-readable medium described herein, transmitting the data may include operations, features, means, or instructions for transmitting the data via a sidelink connection with a third device, where the packet delay may be based on a latency associated with the sidelink connection.

Some examples of the method, apparatuses, and non-transitory computer-readable medium described herein may further include operations, features, means, or instructions for determining the packet delay on a per logical channel basis for the set of logical channels, where the data may be transmitted based on determining the packet delay on a per logical channel basis.

Some examples of the method, apparatuses, and non-transitory computer-readable medium described herein may further include operations, features, means, or instructions for receiving, from the second device, control signaling indicating the one or more logical channels of the set of logical channels, where determining the packet delay on a per logical channel basis may be based on receiving the control signaling indicating the one or more logical channels.

Some examples of the method, apparatuses, and non-transitory computer-readable medium described herein may further include operations, features, means, or instructions for adjusting a respective priority of each of the one or more logical channels of the set of logical channels, where the data may be multiplexed based on adjusting the respective priority of each of the one or more logical channels.

Some examples of the method, apparatuses, and non-transitory computer-readable medium described herein may further include operations, features, means, or instructions for determining the packet delay based on a machine learning algorithm, where the data may be transmitted based on determining the packet delay.

In some examples of the method, apparatuses, and non-transitory computer-readable medium described herein, one or more inputs for the machine learning algorithm include one or more traffic delay parameters, a target packet delay, a delay deadline, a packet transmission reliability, one or more statistical parameters associated with the packet delay, or any combination thereof.

Some examples of the method, apparatuses, and non-transitory computer-readable medium described herein may further include operations, features, means, or instructions for transmitting, to the second device, signaling indicating the parameter value to be used for multiplexing the data, where the data may be transmitted based on transmitting the signaling indicating the parameter value.

In some examples of the method, apparatuses, and non-transitory computer-readable medium described herein, the set of parameter values includes a range of parameter values, a set of discrete values, or both.

In some examples of the method, apparatuses, and non-transitory computer-readable medium described herein, the set of parameter values may be associated with a prioritized bit rate, a bucket size duration, a parameter based on the packet delay, a parameter based on an amount of data exceeding a packet delay threshold, a parameter associated with a scheduling bucket size, or any combination thereof.

In some examples of the method, apparatuses, and non-transitory computer-readable medium described herein, the control signaling may be received in a radio resource control message, a downlink control information message, a medium access control control element, or any combination thereof.

A method for wireless communications at a second device is described. In some examples, the method may include transmitting, to a first device, control signaling indicating a set of parameter values associated with a prioritization procedure for a set of logical channels at the first device. In some examples, the method may further include transmitting, to the first device, a grant scheduling a transmission of data. In some examples, the method may further include receiving the data in response to transmitting the grant, the data multiplexed according to a parameter value of the set of parameter values, the parameter value based on a packet delay associated with one or more logical channels of the set of logical channels.

An apparatus for wireless communications at a second device is described. The apparatus may include a processor and memory coupled to the processor. In some examples, the processor and memory may be configured to transmit, to a first device, control signaling indicating a set of parameter values associated with a prioritization procedure for a set of logical channels at the first device. In some examples, the processor and memory may be further configured to transmit, to the first device, a grant scheduling a transmission of data. In some examples, the processor and memory may be further configured to receive the data in response to transmitting the grant, the data multiplexed according to a parameter value of the set of parameter values, the parameter value based on a packet delay associated with one or more logical channels of the set of logical channels.

Another apparatus for wireless communications at a second device is described. In some examples, the apparatus may include means for transmitting, to a first device, control signaling indicating a set of parameter values associated with a prioritization procedure for a set of logical channels at the first device. In some examples, the apparatus may further include means for transmitting, to the first device, a grant scheduling a transmission of data. In some examples, the apparatus may further include means for receiving the data in response to transmitting the grant, the data multiplexed according to a parameter value of the set of parameter values, the parameter value based on a packet delay associated with one or more logical channels of the set of logical channels.

A non-transitory computer-readable medium storing code for wireless communications at a second device is described. In some examples, the code may include instructions executable by a processor to transmit, to a first device, control signaling indicating a set of parameter values associated with a prioritization procedure for a set of logical channels at the first device. In some examples, the code may further include instructions executable by the processor to transmit, to the first device, a grant scheduling a transmission of data. In some examples, the code may further include instructions executable by the processor to receive the data in response to transmitting the grant, the data multiplexed according to a parameter value of the set of parameter values, the parameter value based on a packet delay associated with one or more logical channels of the set of logical channels.

Some examples of the method, apparatuses, and non-transitory computer-readable medium described herein may further include operations, features, means, or instructions for transmitting, to the first device, control signaling indicating the parameter value to be used for multiplexing the data corresponding to the set of logical channels, where the data may be received in response to transmitting the control signaling indicating the parameter value.

Some examples of the method, apparatuses, and non-transitory computer-readable medium described herein may further include operations, features, means, or instructions for receiving, from the first device, a parameter modification request, where the control signaling indicating the parameter value may be transmitted in response to receiving the parameter modification request.

Some examples of the method, apparatuses, and non-transitory computer-readable medium described herein may further include operations, features, means, or instructions for determining the packet delay based on a delay prediction, where the delay prediction may be based on one or more delay parameters associated with data transmissions and transmitting, to the first device, control signaling indicating the one or more delay parameters associated with data transmissions, where the data may be received in response to transmitting the control signaling indicating the one or more delay parameters associated with data transmissions.

In some examples of the method, apparatuses, and non-transitory computer-readable medium described herein, the delay prediction may be based on a current packet delay, a delay deadline, a backhaul delay, a processing delay, or any combination thereof.

Some examples of the method, apparatuses, and non-transitory computer-readable medium described herein may further include operations, features, means, or instructions for determining the packet delay on a per logical channel basis for the set of logical channels, where the data may be received based on determining the packet delay on a per logical channel basis.

Some examples of the method, apparatuses, and non-transitory computer-readable medium described herein may further include operations, features, means, or instructions for transmitting, to the first device, control signaling indicating the one or more logical channels of the set of logical channels, where determining the packet delay on a per logical channel basis may be based on transmitting the control signaling indicating the one or more logical channels.

Some examples of the method, apparatuses, and non-transitory computer-readable medium described herein may further include operations, features, means, or instructions for determining the packet delay based on a machine learning algorithm and transmitting, to the first device, control signaling indicating the packet delay, where the data may be received in response to transmitting the control signaling indicating the packet delay.

In some examples of the method, apparatuses, and non-transitory computer-readable medium described herein, one or more inputs for the machine learning algorithm include one or more traffic delay parameters, a target packet delay, a delay deadline, a packet transmission reliability, one or more statistical parameters associated with the packet delay, or any combination thereof.

Some examples of the method, apparatuses, and non-transitory computer-readable medium described herein may further include operations, features, means, or instructions for receiving, from the first device, signaling indicating the parameter value to be used for multiplexing the data, where the data may be received based on receiving the signaling indicating the parameter value.

In some examples of the method, apparatuses, and non-transitory computer-readable medium described herein, the set of parameter values includes a range of parameter values, a set of discrete values, or both.

In some examples of the method, apparatuses, and non-transitory computer-readable medium described herein, the set of parameter values may be associated with a prioritized bit rate, a bucket size duration, a parameter based on the packet delay, a parameter based on an amount of data exceeding a packet delay threshold, a parameter associated with a scheduling bucket size, or any combination thereof.

DETAILED DESCRIPTION

Figure 1:
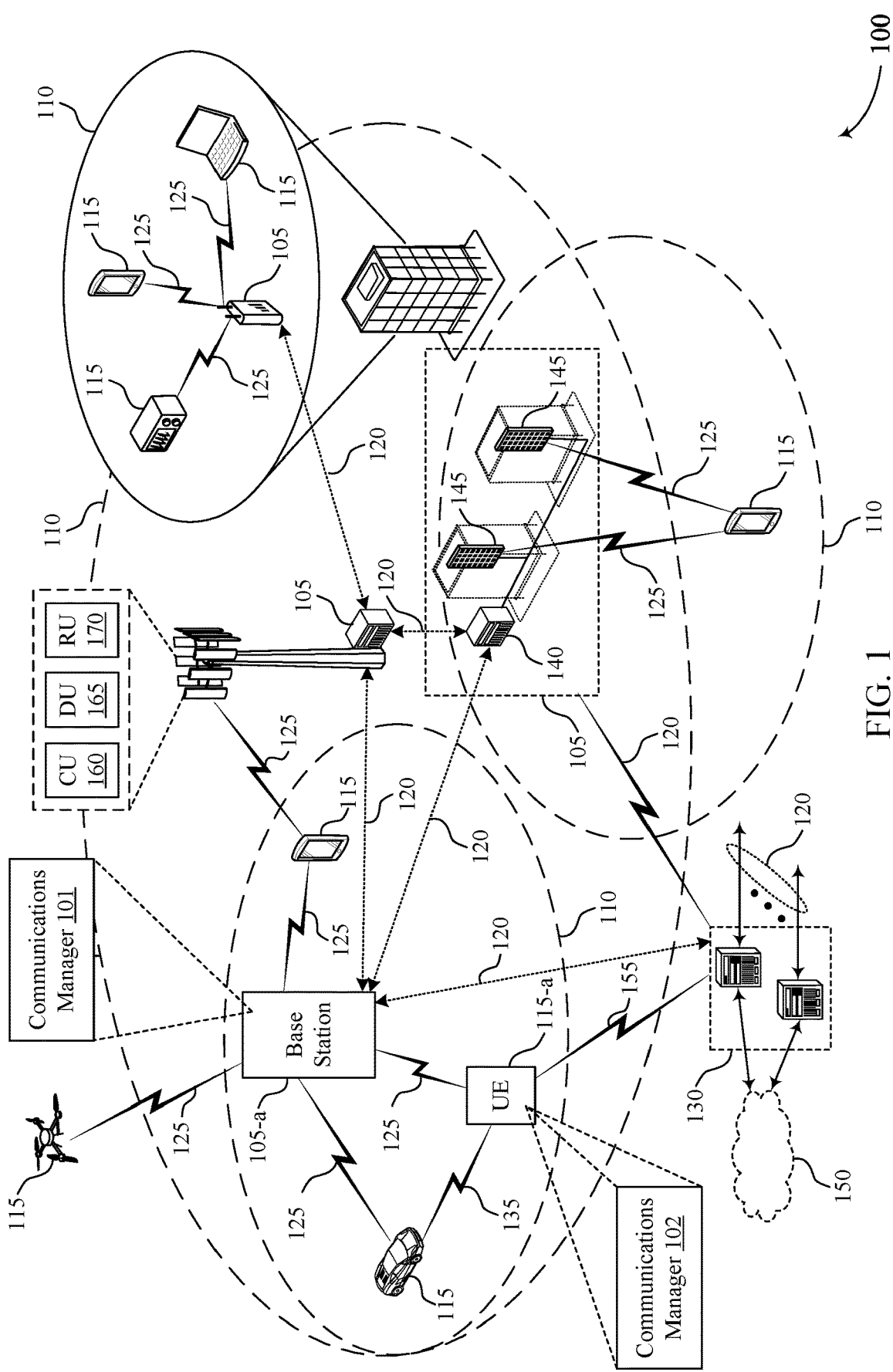
FIG. 1 illustrates an example of a wireless communications system that supports techniques for data multiplexing based on packet delay in accordance with one or more aspects of the present disclosure.

In some wireless communications systems, a first device (e.g., a UE) may receive an uplink grant from a second device (e.g., a base station) scheduling a data transmission. The first device may multiplex the data identified by the grant based on a prioritization procedure for a set of logical channels. For example, the set of logical channels may be ordered based on a priority in accordance with a token bucket procedure, where an amount of data (e.g., which may be referred to as "tokens") in the grant for each logical channel (e.g., which may be referred to as "buckets") may be filled based on a set of parameters configured at the first device. The second device may configure the set of parameters for the first device using semi-static signaling, such as Radio Resource Control (RRC) signaling. In some cases, such as for extended reality (XR) or video traffic applications, the data transmission may have a delay bound or a relative transmission delay bound to reduce jitter (e.g., variation in transmission delay between data transmissions).

That is, the first device may have a configured amount of time (e.g., the delay bound) in which the first device is to process and transmit the data to maintain a user experience at the device. Additionally, the first device may have a configured allowable variation in the delay bound (e.g., the relative transmission delay bound) to maintain the user experience. Data transmission reliability may be improved by multiplexing data based on considering or predicting a transmission delay.

In accordance with techniques disclosed herein, a first device (e.g., a UE) may modify logical channel prioritization based on a packet delay. The first device may receive a set of parameter values for a logical channel prioritization procedure, then select a parameter value from the set based on a packet delay for data scheduled in an uplink grant. The first device may determine the parameter value, or the first device may select the parameter value based on signaling received from a second device (e.g., a base station). According to one or more examples, the first device or the second device may determine the parameter value based on a delay prediction or machine learning, where the first device or the second device may estimate the packet delay based on one or more input parameters, and determine the parameter value accordingly. The set of parameter values may be a set of values for parameters including a prioritized bit rate, a bucket size duration, a parameter based on the packet delay, a parameter based on an amount of data exceeding a packet delay threshold, a parameter associated with a scheduling bucket size, etc.

By implementing one or more of the described techniques for multiplexing data, devices of a wireless communications system may be able to effectively implement transmission schemes based on packet delay in a manner that increases data throughput and improves latency, which may correspond to improved power consumption and communications reliability, among other considerations. For example, based on determining the packet delay, a scheduling device may schedule data more reliably, which may increase data throughput and improve latency by reducing dropped or failed transmissions.

One or more aspects of the disclosure are initially described in the context of wireless communications systems. One or more aspects of the disclosure are further illustrated by and described with reference to a process flow, apparatus diagrams, system diagrams, and flowcharts that relate to techniques for data multiplexing based on packet delay.

FIG. 1 illustrates an example of a wireless communications system 100 that supports techniques for data multiplexing based on packet delay in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In some implementations, the UEs 115 may be or include disaggregated UEs 115 in which one or more of the various functions and communication layers of the UE 115 may be split between multiple physical devices for communication between UEs 115 and base stations 105. In such cases, the disaggregated UE 115 may include the respective physical devices configured to perform various functions and communications, for example to perform one or more of the signaling and power control techniques for RF sensing procedures described herein.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels.

In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that, although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

Techniques described herein, in addition to or as an alternative to being carried out between UEs 115 and base stations 105, may be implemented via additional or alternative wireless devices, including distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 170 is flexible and as such gives rise to numerous permutations of different functionalities depending upon which functions (e.g., MAC functions, baseband functions, radio frequency functions, and any combinations thereof) are performed at the CU 160, DU 165, and RU 170. For example, a functional split of the protocol stack may be employed between a DU 165 and an RU 170 such that the DU 165 may support one or more layers of the protocol stack and the RU 170 may support one or more different layers of the protocol stack.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In accordance with one or more aspects of the present disclosure, the wireless communications system 100 may support modification to logical channel prioritization at a UE 115 based on a packet delay. For example, the UE 115 may receive a set of parameter values for a logical channel prioritization procedure, then select a parameter value from the set based on a packet delay for data scheduled in an uplink grant. The UE 115 may determine the parameter value, or the UE 115 may select the parameter value based on signaling received from a base station 105. The UE 115 or the base station may determine the parameter value based on a delay prediction or machine learning. The set of parameter values may be a set of values for parameters including a prioritized bit rate, a bucket size duration, a parameter based on the packet delay, a parameter based on an amount of data exceeding a packet delay threshold, a parameter associated with a scheduling bucket size, etc.

In some examples, a base station 105-a may include a communications manager 101 that is configured to support one or more aspects of the techniques for data multiplexing based on packet delay described herein. For example, the communications manager 101 may support the base station 105-a transmitting (e.g., to a UE 115-a), control signaling indicating a set of parameter values associated with a prioritization procedure for a set of logical channels. In some examples, the communications manager 101 may be configured to support the base station 105-a transmitting (e.g., to the UE 115-a) a grant scheduling a transmission of data. In some examples, the communications manager 101 may be configured to support the base station 105-a receiving (e.g., from the UE 115-a) the data in response to transmitting the grant, the data multiplexed according to a parameter value of the set of parameter values, the parameter value based on a packet delay associated with one or more logical channels of the set of logical channels.

In some examples, the UE 115-a may include a communications manager 102 that is configured to support one or more aspects of the techniques for data multiplexing based on packet delay described herein. For example, the communications manager 102 may be configured to support the UE 115-a receiving (e.g., from the base station 105-a) control signaling indicating a set of parameter values associated with a prioritization procedure for a set of logical channels. In some examples, the communications manager 102 may be configured to support the UE 115-a receiving (e.g., from the base station 105-a) a grant scheduling a transmission of data. In some examples, the communications manager 102 may be configured to support the UE 115-a transmitting (e.g., to the base station 105-a) the data in response to receiving the grant, the data multiplexed according to a parameter value of the set of parameter values, the parameter value based on a packet delay associated with one or more logical channels of the set of logical channels.

Figure 2:
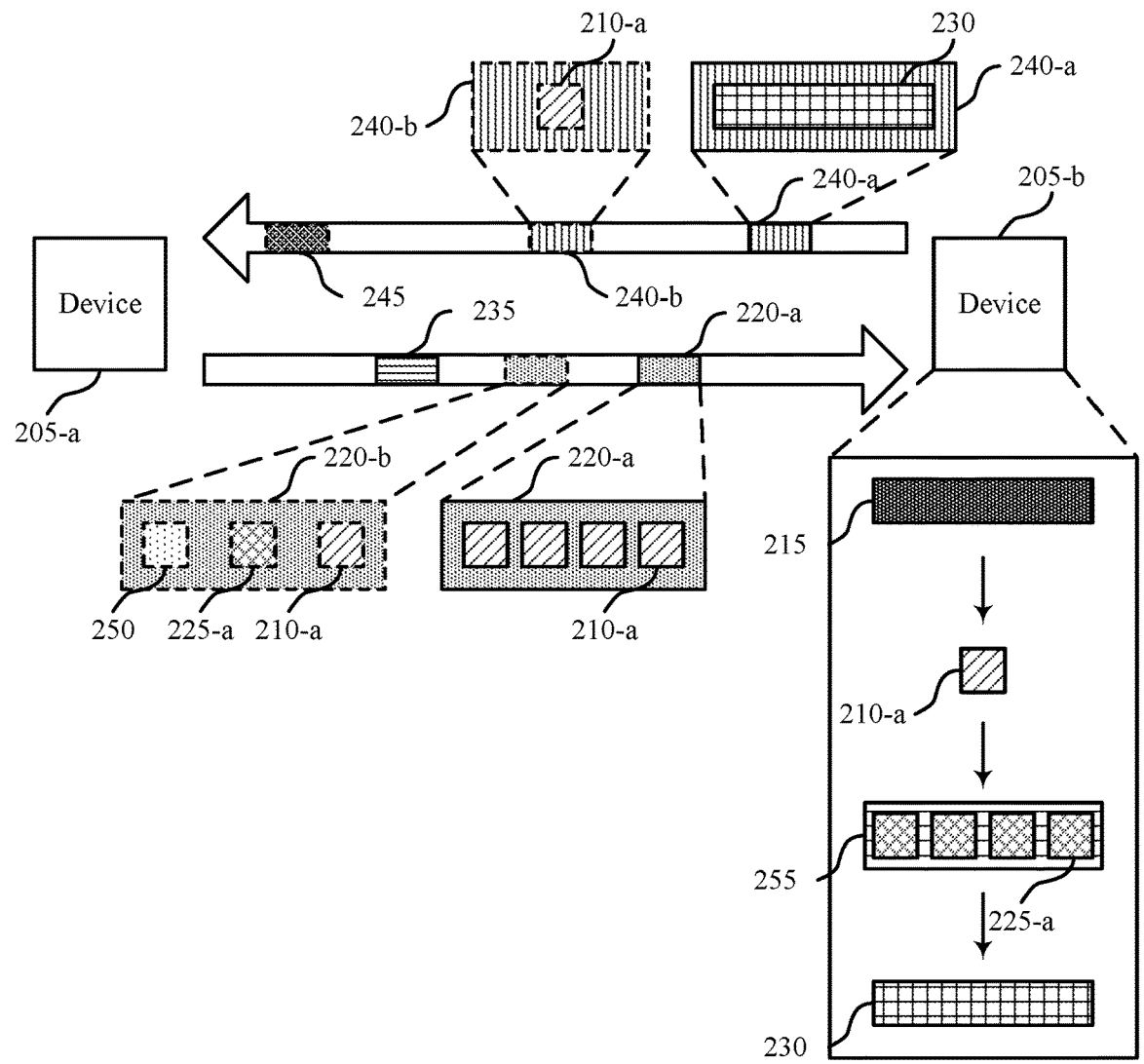
FIG. 2 illustrates an example of a wireless communications system that supports techniques for data multiplexing based on packet delay in accordance with one or more aspects of the present disclosure.
Figure 2:
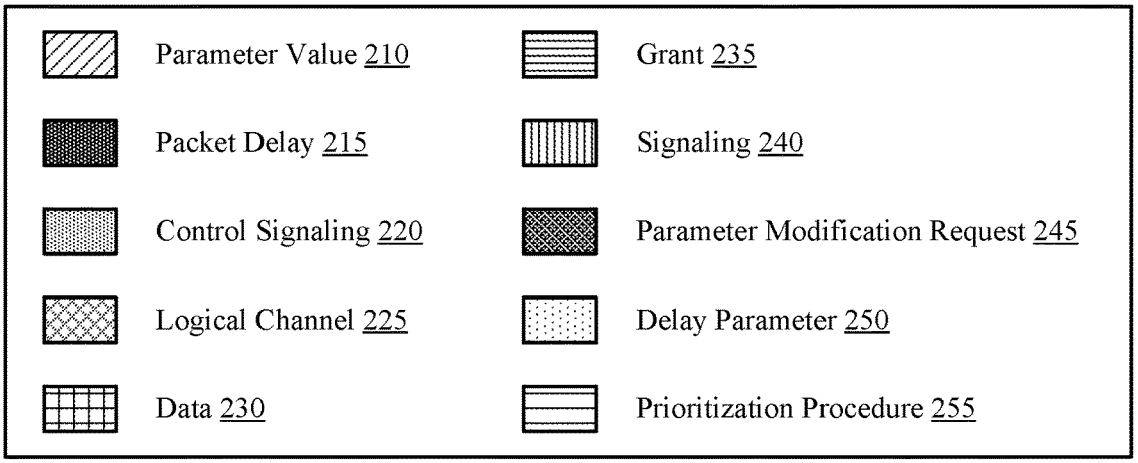

FIG. 2 illustrates an example of a wireless communications system 200 that supports techniques for data multiplexing based on packet delay in accordance with one or more aspects of the present disclosure. In some examples, the wireless communications system 200 may implement aspects of the wireless communications system 100. For example, the wireless communications system 200 may include one or more devices 205, each of which may be an example of a UE 115 or a base station 105 described with reference to FIG. 1. The wireless communications system 200 may include features for improved communications between the devices 205, among other benefits.

The devices 205 may communicate via one or more channels. For example, a device 205-a may transmit to a device 205-b a grant 235 (e.g., an uplink grant 235) scheduling a transmission of data 230 in signaling 240-a. The device 205-b may multiplex the data 230 based on a prioritization procedure 255 for a set of logical channels 225. As described herein, the device 205-b may transmit control signaling 220-a indicating a set of parameter values 210 associated with the prioritization procedure 255, then select a parameter value 210-a from the set of parameter values 210 based on a packet delay 215 for the data 230. In some examples, the packet delay 215 may be based on a delay or jitter of packets in the prioritization procedure 255. The device 205-b may use the parameter value 210-a to modify the prioritization procedure 255 based on the packet delay 215, which may enable the device 205-a to schedule additional data using the grant 235. In some examples, the set of parameter values 210 in the control signaling 220-a may include a range of values, one or more discrete values, or both.

In some examples, the parameter value 210-a may correspond to a parameter prioritisedBitRate, which may set a prioritized bit rate (PBR) for the prioritization procedure 255. In some examples, the parameter value 210-a may correspond to a parameter bucketSizeDuration, which may set a bucket size duration (BSD) for the prioritization procedure 255. In some examples, the parameter value 210-a may correspond to a parameter D, which may be based on a delay or a jitter of packets (e.g., the packet delay 215) in a queue at the device 205-b, or the parameter value 210-a may correspond to a parameter Q, which may be based on an amount of data associated with the grant 235 exceeding a delay or jitter threshold, or the parameter value 210-a may correspond to a parameter P, which may be associated with a scheduling bucket size of the prioritization procedure 255. In some examples, the parameter value 210-a may include respective parameter values 210 for each logical channel 225 of the set of logical channels 225. That is, the parameter value 210 may be determined or selected on a per logical channel 225 basis.

In an example, the device 205-b may maintain a variable Bj for a logical channel 225 with an index j. A MAC entity at the device 205-b may initialize the variable Bj to zero when the logical channel 225 is established in the prioritization procedure 255. The MAC entity may increment Bj by a product PBR×T before each instance of the prioritization procedure 255, where T may be a time elapsed since Bj was last incremented. If, after incrementing Bj, the value of Bj is greater than a bucket size (e.g., PBR×BSD×D), the MAC entity may set Bj to the bucket size. The MAC entity may allocate resources (e.g., in the signaling 240-a) to the logical channels 225 in a decreasing priority order as part of the prioritization procedure 255. In some examples, the MAC entity may decrement Bj by a total size of MAC service data units (SDUs) served to the logical channel 225 with index j. In some examples, if the parameter Q is greater than zero, and the value of Bj is less than or equal to zero, the MAC entity may set the value of Bj equal to P to allow for scheduling additional data for the logical channel 225 with index j.

In some examples, the device 205-a may transmit control signaling 220-b indicating the parameter value 210-a to be used in the prioritization procedure 255 for multiplexing the data 230. For example, the control signaling 220-a indicating the set of parameter values 210 may be RRC signaling (e.g., semi-static signaling), and the control signaling 220-b may be a downlink control information (DCI) message or a MAC control element (MAC-CE) that dynamically updates the parameter value 210-a (e.g., corresponding to the PBR or the BSD). In some examples, the device 205-a may set the parameter value 210-a using a delay prediction, for example as a function of a current packet delay 215, a prediction of the packet delay 215 for the data 230, a delay deadline, a backhaul delay, a processing delay, or any combination thereof.

In some examples, the device 205-b may be enabled to modify parameters for the prioritization procedure 255 and select the parameter value 210-a based on determining the packet delay 215. In some examples, the range or set of the parameter values 210 may be configured by RRC signaling (e.g., the control signaling 220-a). In some examples, the device 205-a may indicate (e.g., in the control signaling 220-b) one or more logical channels 225 (e.g., including a logical channel 225-a) for which parameters for the prioritization procedure 255 may be modified.

In some examples, the device 205-a may indicate (e.g., in the control signaling 220-b) one or more delay parameters 250 to enable the device 205-b to determine the packet delay 215. For example, a delay parameter 250 may include a delay deadline. The device 205-b may determine the parameter value 210-a as a function of the delay parameter 250. For example, a logical channel 225 experiencing a greater packet delay 215 may be mapped to a higher priority in the prioritization procedure 255 than a logical channel 225 experiencing a smaller packet delay 215.

In some examples, one or more devices 205 may modify parameters for the prioritization procedure 255 based on a machine learning algorithm. For example, the machine learning algorithm may be based on the one or more delay parameters 250, a target packet delay 215, one or more metrics associated with predicting the packet delay 215 (e.g., a packet transmission reliability), one or more statistical parameters associated with the packet delay 215 (e.g., second order statistics, such as a variance of the jitter), or any combination thereof. In some examples, the device 205-a may indicate a machine learning model to the device 205-b (e.g., based on indicating the parameter value 210-a, the logical channel 225-a, or the delay parameter 250 in the control signaling 220-b) to enable the device 205-b to predict the packet delay 215. Additionally or alternatively, the device 205-b may implement the machine learning algorithm to modify parameters for the prioritization procedure 255. For example, based on the machine learning algorithm (e.g., using the control signaling 220-b from the device 205-a or implementing the machine learning algorithm at the device 205-b), the device 205-b may determine the packet delay 215 and select the parameter value 210-a for use in the prioritization procedure 255.

In some examples, such as based on implementing the machine learning algorithm, the device 205-b may transmit a parameter modification request 245 to the device 205-a. The parameter modification request 245 may request that the parameter value 210-a be configured for use in the prioritization procedure 255. Based on the parameter modification request 245, the device 205-a may indicate the parameter value 210-a in the control signaling 220-b. Additionally or alternatively, the device 205-b may transmit signaling 240-b indicating that the device 205-b will use the parameter value 210-a in the prioritization procedure 255. The device 205-a may confirm the selection by indicating the parameter value 210-a in the control signaling 220-b.

Figure 3:
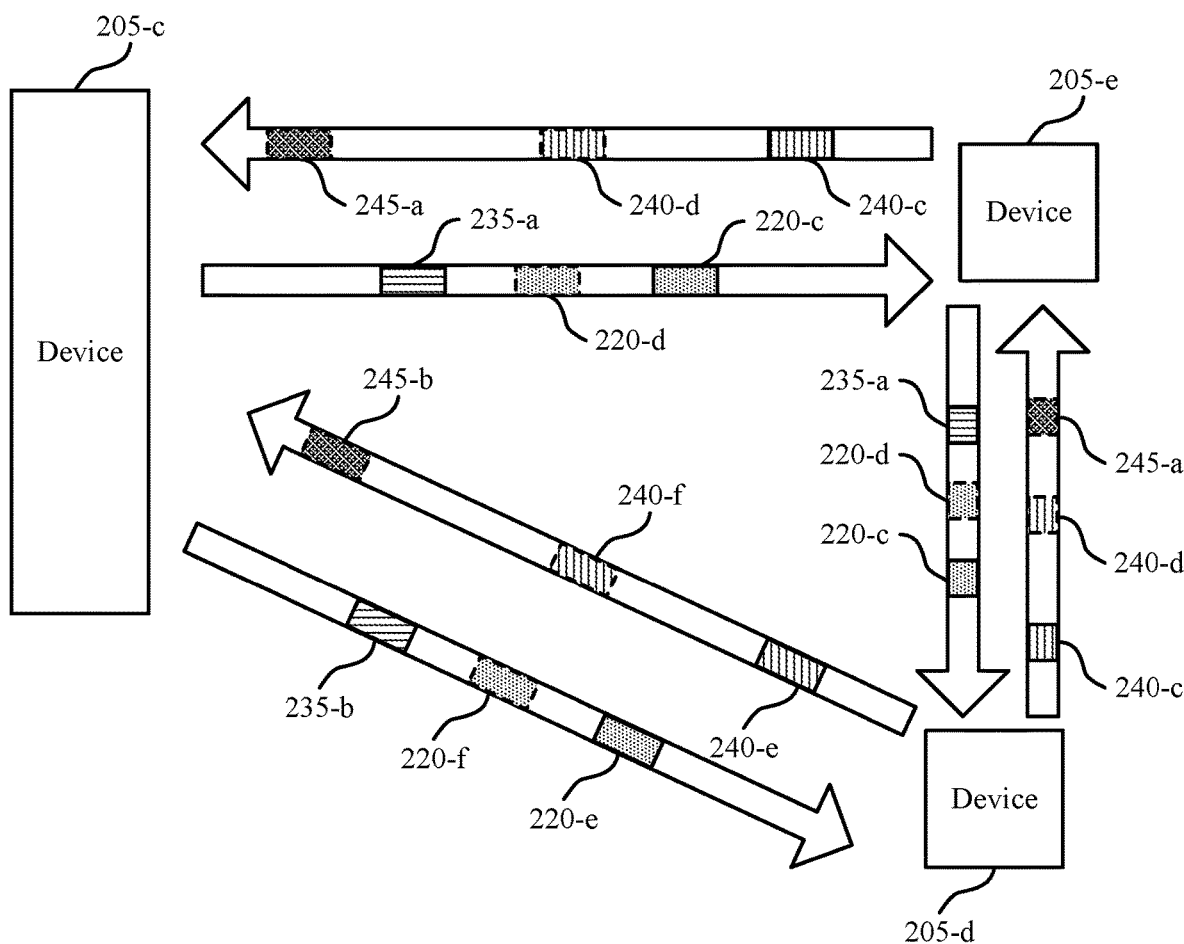
FIG. 3 illustrates an example of a wireless communications system that supports techniques for data multiplexing based on packet delay in accordance with one or more aspects of the present disclosure.

FIG. 3 illustrates an example of a wireless communications system 300 that supports techniques for data multiplexing based on packet delay in accordance with one or more aspects of the present disclosure. In some examples, the wireless communications system 300 may implement aspects of the wireless communications systems 100 and 200. For example, the wireless communications system 300 may include one or more devices 205, each of which may be an example of a UE 115 or a base station 105 described with reference to FIG. 1. The wireless communications system 300 may include features for improved communications between the devices 205, among other benefits.

The devices 205 may communicate via one or more channels. For example, a device 205-d may communicate directly with a device 205-c on an interface, which may be referred to as a Uu interface. Additionally or alternatively, the device 205-d may communicate with the device 205-c via a device 205-e, where the device 205-d may communicate with the device 205-e on a sidelink interface and the device 205-e may relay communications between the devices 205-c and 205-d.

The device 205-c may transmit a grant 235 (e.g., a grant 235-a or a grant 235-b) to the device 205-d scheduling a data transmission in signaling 240. In cases of joint sidelink and Uu operation, where the device 205-d is served by the devices 205-c and 205-e, the device 205-d may transmit the scheduled data directly on the Uu interface (e.g., in signaling 240-e) or via the device 205-e on the sidelink interface (e.g., in signaling 240-c). The device 205-d may multiplex the data based on a prioritization procedure for a set of logical channels. In some examples, one or more devices 205 may modify parameters for the prioritization procedure based on the interface used to transmit the data. For example, a packet delay associated with using the sidelink interface may be greater than a packet delay associated with using the Uu interface, and parameters for the prioritization procedure may be modified based on additional latency. In some examples, the device 205-d may be configured with a set of parameter values for the prioritization procedure associated with the sidelink interface, and the device 205-d may autonomously update the parameter value from the configured set based on a current or predicted status (e.g., the packet delay).

In an example, the device 205-d may communicate with the device 205-c via the device 205-e on the sidelink interface. The device 205-c may transmit control signaling 220-c indicating a set of parameter values for the prioritization procedure. The device 205-c may transmit a grant 235-a scheduling a transmission of data in signaling 240-c. The device 205-d may select a parameter value from the set based on a packet delay for the data, where the packet delay may be based on using the sidelink interface. In some examples, the device 205-c may transmit control signaling 220-d indicating the parameter value the device 205-d is to use in the prioritization procedure. Additionally or alternatively, the device 205-c may transmit a parameter modification request 245-a requesting that a parameter value be configured for use in the prioritization procedure. Based on the parameter modification request 245-a, the device 205-c may indicate the requested parameter value in the control signaling 220-d. Additionally or alternatively, the device 205-d may transmit signaling 240-d indicating that the device 205-d will use the selected parameter value in the prioritization procedure. The device 205-c may confirm the selection by indicating the parameter value in the control signaling 220-d. The device 205-d may multiplex the data using the prioritization procedure for a set of logical channels based on the selected parameter value and transmit the data in the signaling 240-c.

In another example, the device 205-d may communicate directly with the device 205-c on the Uu interface. The device 205-c may transmit control signaling 220-e indicating a set of parameter values for the prioritization procedure. The device 205-c may transmit a grant 235-b scheduling a transmission of data in signaling 240-e. The device 205-d may select a parameter value from the set based on a packet delay for the data, where the packet delay may be based on using the Uu interface. In some examples, the device 205-c may transmit control signaling 220-f indicating the parameter value the device 205-d is to use in the prioritization procedure. Additionally or alternatively, the device 205-c may transmit a parameter modification request 245-b requesting that a parameter value be configured for use in the prioritization procedure. Based on the parameter modification request 245-b, the device 205-c may indicate the requested parameter value in the control signaling 220-f. Additionally or alternatively, the device 205-d may transmit signaling 240-f indicating that the device 205-d will use the selected parameter value in the prioritization procedure. The device 205-c may confirm the selection by indicating the parameter value in the control signaling 220-f. The device 205-d may multiplex the data using the prioritization procedure for a set of logical channels based on the selected parameter value and transmit the data in the signaling 240-e.

Figure 4:
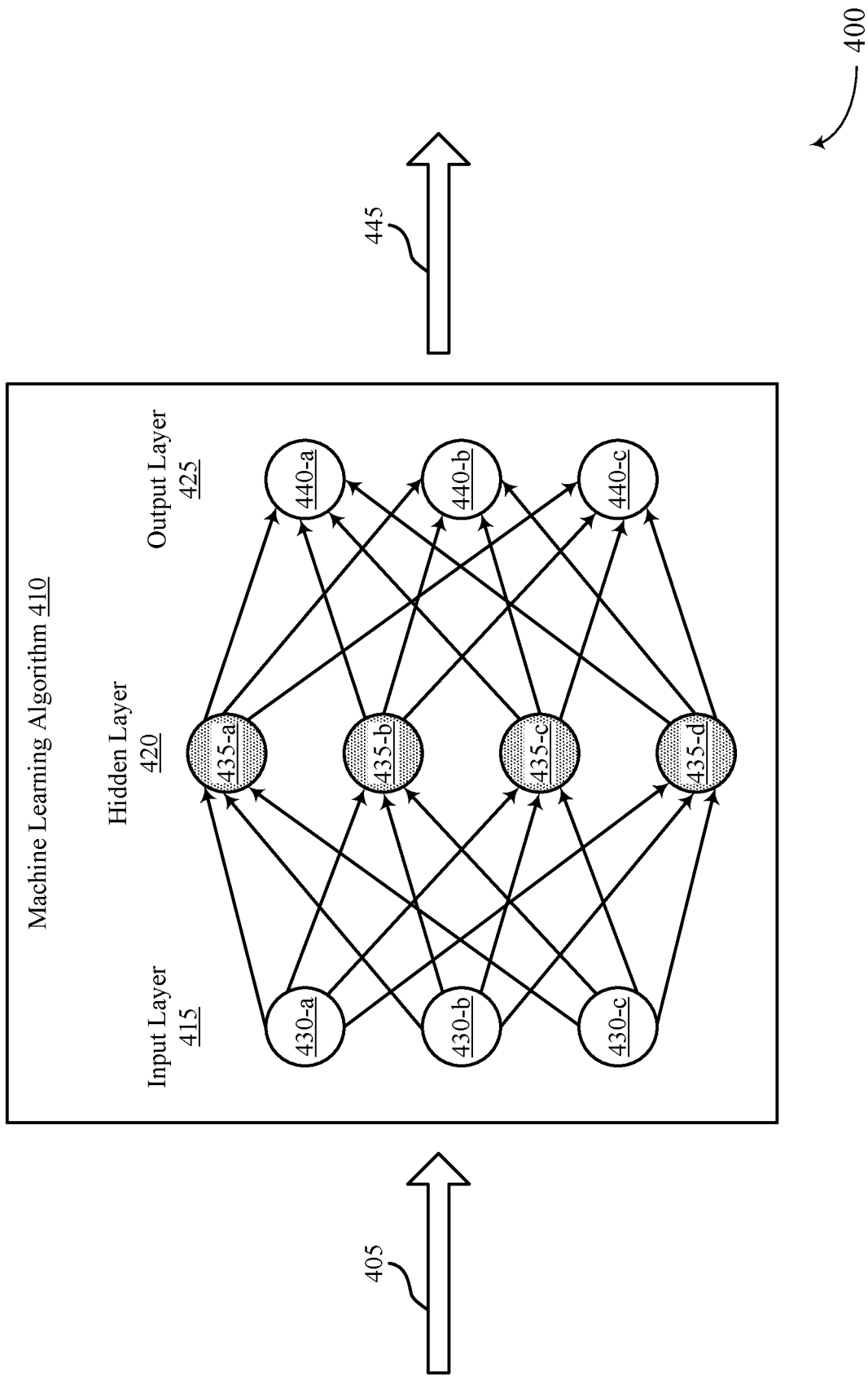
FIG. 4 illustrates an example of a machine learning process that supports techniques for data multiplexing based on packet delay in accordance with one or more aspects of the present disclosure.

FIG. 4 illustrates an example of a machine learning process 400 that supports techniques for data multiplexing based on packet delay in accordance with one or more aspects of the present disclosure. The machine learning process 400 may be implemented at one or more devices, each of which may be an example of a UE 115 or a base station 105 described with reference to FIG. 1.

The machine learning process 400 may include a machine learning algorithm 410. As illustrated, the machine learning algorithm 410 may be an example of a neural network, such as a feed forward (FF) or deep feed forward (DFF) neural network, a recurrent neural network (RNN), a long/short term memory (LSTM) neural network, or any other type of neural network. However, any other machine learning algorithms may be supported. For example, the machine learning algorithm 410 may implement a nearest neighbor algorithm, a linear regression algorithm, a Naïve Bayes algorithm, a random forest algorithm, or any other machine learning algorithm. Furthermore, the machine learning process 400 may involve supervised learning, unsupervised learning, semi-supervised learning, reinforcement learning, or any combination thereof.

The machine learning algorithm 410 may include an input layer 415, one or more hidden layers 420, and an output layer 425. In a fully connected neural network with one hidden layer 420, each hidden layer node 435 may receive a value from each input layer node 430 as input, where each input may be weighted. These neural network weights may be based on a cost function that is revised during training of the machine learning algorithm 410. Similarly, each output layer node 440 may receive a value from each hidden layer node 435 as input, where the inputs are weighted. If post-deployment training (e.g., online training) is supported, memory may be allocated to store errors and/or gradients for reverse matrix multiplication. These errors and/or gradients may support updating the machine learning algorithm 410 based on output feedback. Training the machine learning algorithm 410 may support computation of the weights (e.g., connecting the input layer nodes 430 to the hidden layer nodes 435 and the hidden layer nodes 435 to the output layer nodes 440) to map an input pattern to a desired output outcome. This training may result in a device-specific machine learning algorithm 410 based on the historic application data and data transfer for a specific device (e.g., a base station 105 or a UE 115).

In some examples, input values 405 may be sent to the machine learning algorithm 610 for processing. In some example, preprocessing may be performed according to a sequence of operations on the input values 405 such that the input values 405 may be in a format that is compatible with the machine learning algorithm 410. The input values 405 may be converted into a set of k input layer nodes 630 at the input layer 415. In some cases, different measurements may be input at different input layer nodes 430 of the input layer 415. Some input layer nodes 430 may be assigned default values (e.g., values of 0) if the number of input layer nodes 430 exceeds the number of inputs corresponding to the input values 405. As illustrated, the input layer 615 may include three input layer nodes 430-a, 430-b, and 430-c. However, it is to be understood that the input layer 415 may include any number of input layer nodes 430 (e.g., 20 input nodes).

The machine learning algorithm 410 may convert the input layer 415 to a hidden layer 420 based on a number of input-to-hidden weights between the k input layer nodes 430 and the n hidden layer nodes 435. The machine learning algorithm 410 may include any number of hidden layers 420 as intermediate steps between the input layer 415 and the output layer 425. Additionally, each hidden layer 420 may include any number of hidden layer nodes 435. For example, as illustrated, the hidden layer 420 may include four hidden layer nodes 435-a, 435-b, 435-c, and 435-d. However, it is to be understood that the hidden layer 420 may include any number of hidden layer nodes 435 (e.g., 10 input nodes). In a fully connected neural network, each node in a layer may be based on each node in the previous layer. For example, the value of hidden layer node 435-a may be based on the values of input layer nodes 430-a, 430-b, and 430-c (e.g., with different weights applied to each node value).

The machine learning algorithm 410 may determine values for the output layer nodes 440 of the output layer 425 following one or more hidden layers 420. For example, the machine learning algorithm 410 may convert the hidden layer 420 to the output layer 425 based on a number of hidden-to-output weights between the n hidden layer nodes 435 and the m output layer nodes 440. In some cases, n=m. Each output layer node 440 may correspond to a different output value 445 of the machine learning algorithm 410. As illustrated, the machine learning algorithm 410 may include three output layer nodes 440-a, 440-b, and 440-c, supporting three different threshold values. However, it is to be understood that the output layer 425 may include any number of output layer nodes 440. In some examples, post-processing may be performed on the output values 445 according to a sequence of operations such that the output values 445 may be in a format that is compatible with reporting the output values 445.

As described herein, a first device (e.g., a UE) may receive a set of parameter values for a logical channel prioritization procedure, then select a parameter value from the set based on a packet delay for data scheduled in an uplink grant. The first device may determine the parameter value, or the first device may select the parameter value based on signaling received from a second device (e.g., a base station). The first device or the second device may determine the parameter value based on a machine learning algorithm 410 as described herein, where the determined parameter value may be an output value 445 of the machine learning algorithm 410. The set of parameter values may be a set of values for parameters including a prioritized bit rate, a bucket size duration, a parameter based on the packet delay, a parameter based on an amount of data exceeding a packet delay threshold, a parameter associated with a scheduling bucket size, etc. In some examples, the input values 405 may include one or more delay parameters, a target packet delay, one or more metrics associated with predicting the packet delay (e.g., a packet transmission reliability), one or more statistical parameters associated with the packet delay (e.g., second order statistics, such as a variance of jitter), or any combination thereof.

Figure 5:
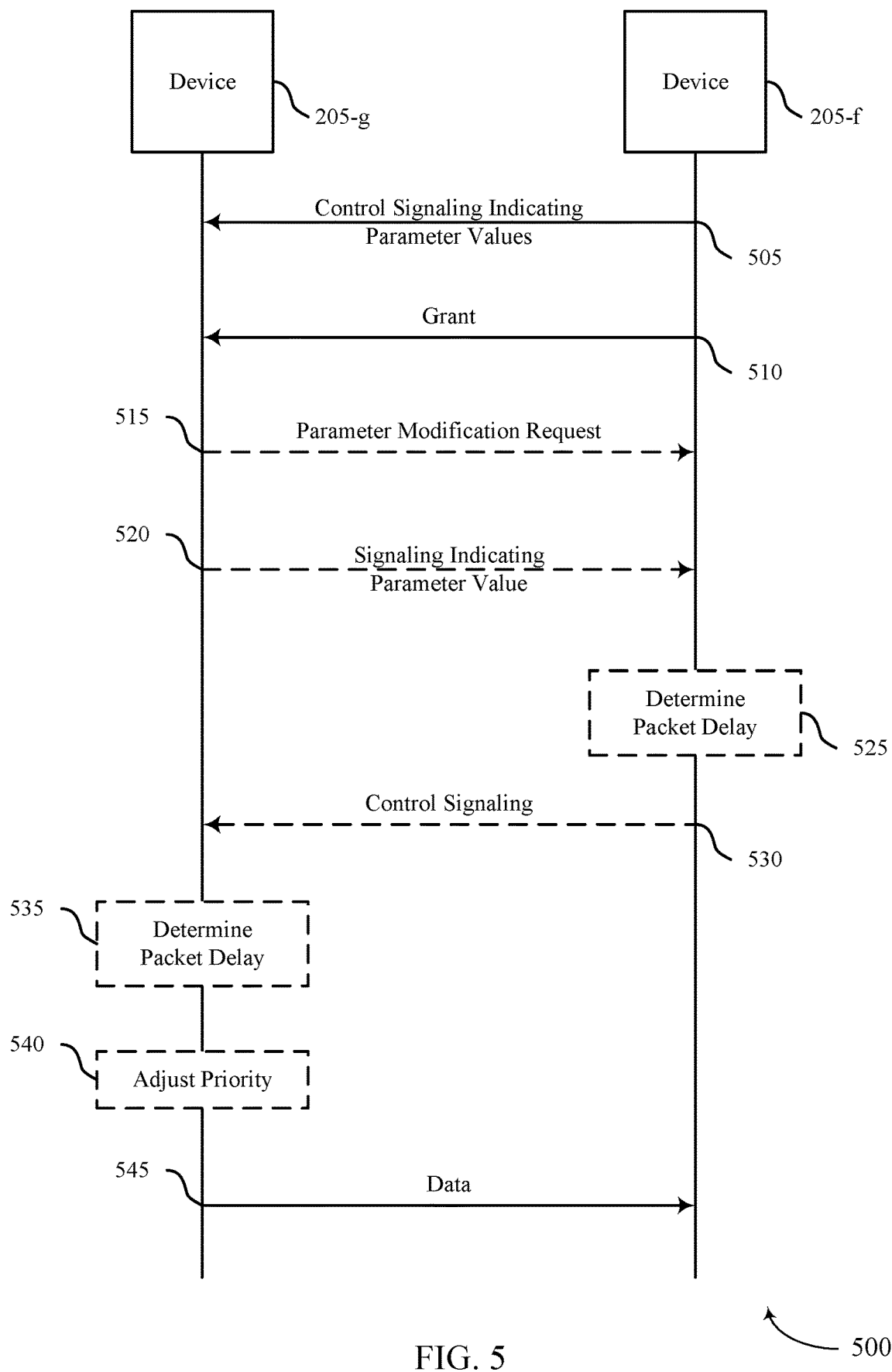
FIG. 5 illustrates an example of a process flow that supports techniques for data multiplexing based on packet delay in accordance with one or more aspects of the present disclosure.

FIG. 5 illustrates an example of a process flow 500 that supports techniques for data multiplexing based on packet delay in accordance with one or more aspects of the present disclosure. In some examples, the process flow 500 may implement one or more aspects of wireless communications systems 100, 200, and 300. For example, the process flow 500 may include example operations associated with one or more devices 205, each of which may be an example of a UE 115 or a base station 105 described with reference to FIG. 1. In the following description of the process flow 500, the operations between the devices 205 may be performed in a different order than the example order shown, or the operations performed by the devices 205 may be performed in different orders or at different times. Some operations may also be omitted from the process flow 500, and other operations may be added to the process flow 500. The operations performed by the devices 205 may support improvements to data multiplexing operations and, in some examples, may increase communications efficiency, among other benefits.

At 505, a device 205-f may transmit control signaling to a device 205-g indicating a set of parameter values associated with a prioritization procedure at the 205-g. In some examples, the control signaling may be transmitted in RRC signaling. In some examples, the set of parameter values in the control signaling may include a range of values, one or more discrete values, or both. In some examples, the set of parameter values may be associated with a prioritized bit rate (e.g., PBR), a bucket size duration (e.g., BSD), a parameter based on a packet delay (e.g., D), a parameter based on an amount of data exceeding a packet delay threshold (e.g., Q), a parameter associated with a scheduling bucket size (e.g., P), or any combination thereof.

At 510, the device 205-f may transmit to the device 205-g a grant scheduling a transmission of data. In some examples, the grant may be an uplink grant.

In some examples, at 515 the device 205-g may transmit a parameter modification request to the device 205-f requesting that a parameter value be configured for use in the prioritization procedure. In some examples, at 520 the device 205-g may transmit signaling indicating the parameter value the device 205-g will use in the prioritization procedure.

In some examples, at 525 the device 205-f may determine the packet delay associated with transmitting the data. In some examples, the packet delay may be based on a delay or jitter of packets in the prioritization procedure. In some examples, the device 205-f may determine the packet delay based on a delay prediction or a machine learning algorithm. For example, the machine learning algorithm may be based on one or more delay parameters, a target packet delay, one or more metrics associated with predicting the packet delay (e.g., a packet transmission reliability), one or more statistical parameters associated with the packet delay (e.g., second order statistics, such as a variance of the jitter), or any combination thereof. In some examples, the delay prediction may be a function of a current packet delay, a prediction of the packet delay for the data, a delay deadline, a backhaul delay, a processing delay, or any combination thereof.

In some examples, at 530 the device 205-f may transmit control signaling, such as RRC signaling, a DCI message, or a MAC-CE, to the device 205-g. The control signaling may indicate one or more delay parameters, one or more logical channels for which parameters for the prioritization procedure may be modified, the selected parameter value, or any combination thereof. The control signaling may enable the device 205-*g* to predict the packet delay. In some examples, at 535 the device 205-*g* may determine the packet delay for the data.

In some examples, at 540 the device 205-*g* may adjust a respective priority of one or more logical channels of the set of logical channels. For example, a logical channel experiencing a greater packet delay may be mapped to a higher priority in the prioritization procedure than a logical channel experiencing a smaller packet delay.

At 545, the device 205-*g* may transmit the data to the device 205-*f* in response to the grant. The data may be multiplex according to the selected parameter value of the set of parameter values. By implementing one or more of the described techniques for data multiplexing, the devices 205 may be able to transmit data more efficiently, or in a manner that increases data throughput, or considers power consumption or processing load, among other considerations.

Figure 6:
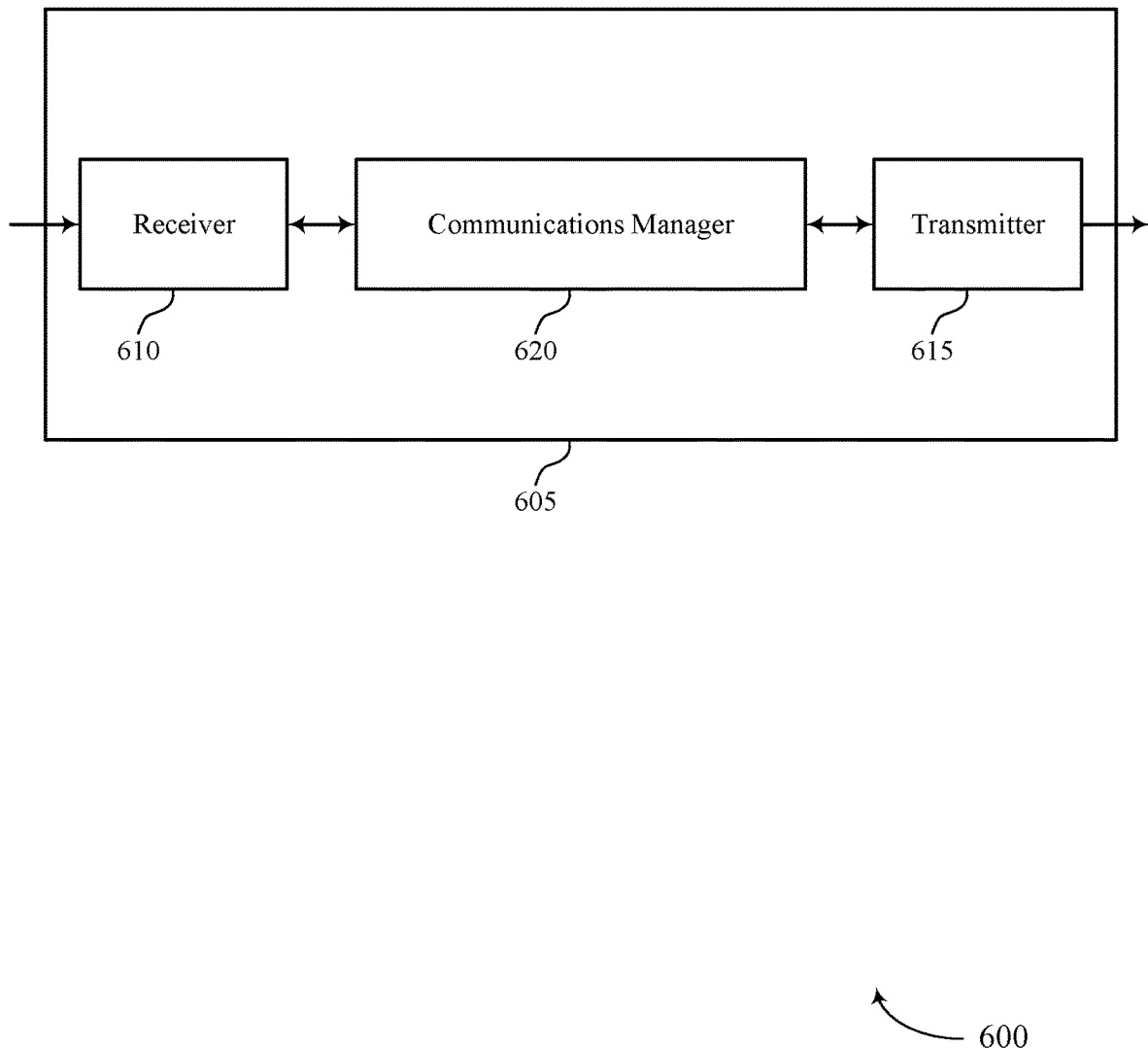
FIGS. 6 and 7 show block diagrams of devices that support techniques for data multiplexing based on packet delay in accordance with one or more aspects of the present disclosure.

FIG. 6 shows a block diagram 600 of a device 605 that supports techniques for data multiplexing based on packet delay in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for data multiplexing based on packet delay). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for data multiplexing based on packet delay). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for data multiplexing based on packet delay as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first device in accordance with examples as disclosed herein. For example, the communications manager 620 may be configured as or otherwise support a means for receiving, from a second device, control signaling indicating a set of parameter values associated with a prioritization procedure for a set of logical channels. The communications manager 620 may be configured as or otherwise support a means for receiving, from the second device, a grant scheduling a transmission of data. The communications manager 620 may be configured as or otherwise support a means for transmitting the data to the second device in response to receiving the grant, the data multiplexed according to a parameter value of the set of parameter values, the parameter value based on a packet delay associated with one or more logical channels of the set of logical channels.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reducing power consumption and increasing transmission reliability. In some aspects, the processor of the device 605 may multiplex data while taking the packet delay into consideration. For example, the processor of the device 605 may turn on one or more processing units for determining the packet delay, increase a processing clock, or a similar mechanism within the device 605. As such, when subsequent grants are received, the processor may more reliably multiplex the data based on the packet delay. Improvements in data multiplexing may result in improvements in power saving and communications reliability, which may further increase power efficiency at the device 605 (e.g., by eliminating unnecessary data retransmissions).

Figure 7:
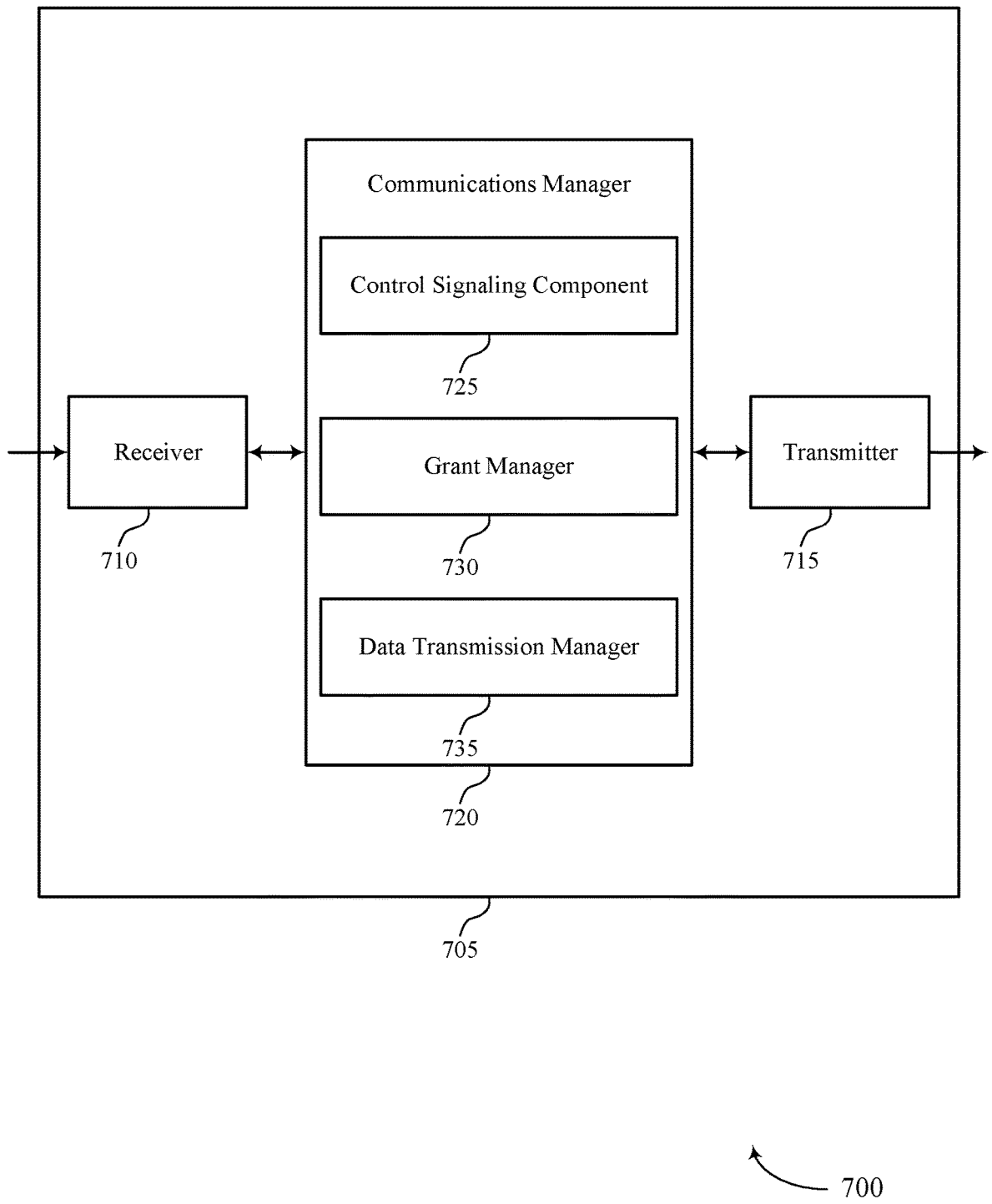

FIG. 7 shows a block diagram 700 of a device 705 that supports techniques for data multiplexing based on packet delay in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for data multiplexing based on packet delay). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for data multiplexing based on packet delay). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for data multiplexing based on packet delay as described herein. For example, the communications manager 720 may include a control signaling component 725, a grant manager 730, a data transmission manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first device in accordance with examples as disclosed herein. The control signaling component 725 may be configured as or otherwise support a means for receiving, from a second device, control signaling indicating a set of parameter values associated with a prioritization procedure for a set of logical channels. The grant manager 730 may be configured as or otherwise support a means for receiving, from the second device, a grant scheduling a transmission of data. The data transmission manager 735 may be configured as or otherwise support a means for transmitting the data to the second device in response to receiving the grant, the data multiplexed according to a parameter value of the set of parameter values, the parameter value based on a packet delay associated with one or more logical channels of the set of logical channels.

Figure 8:
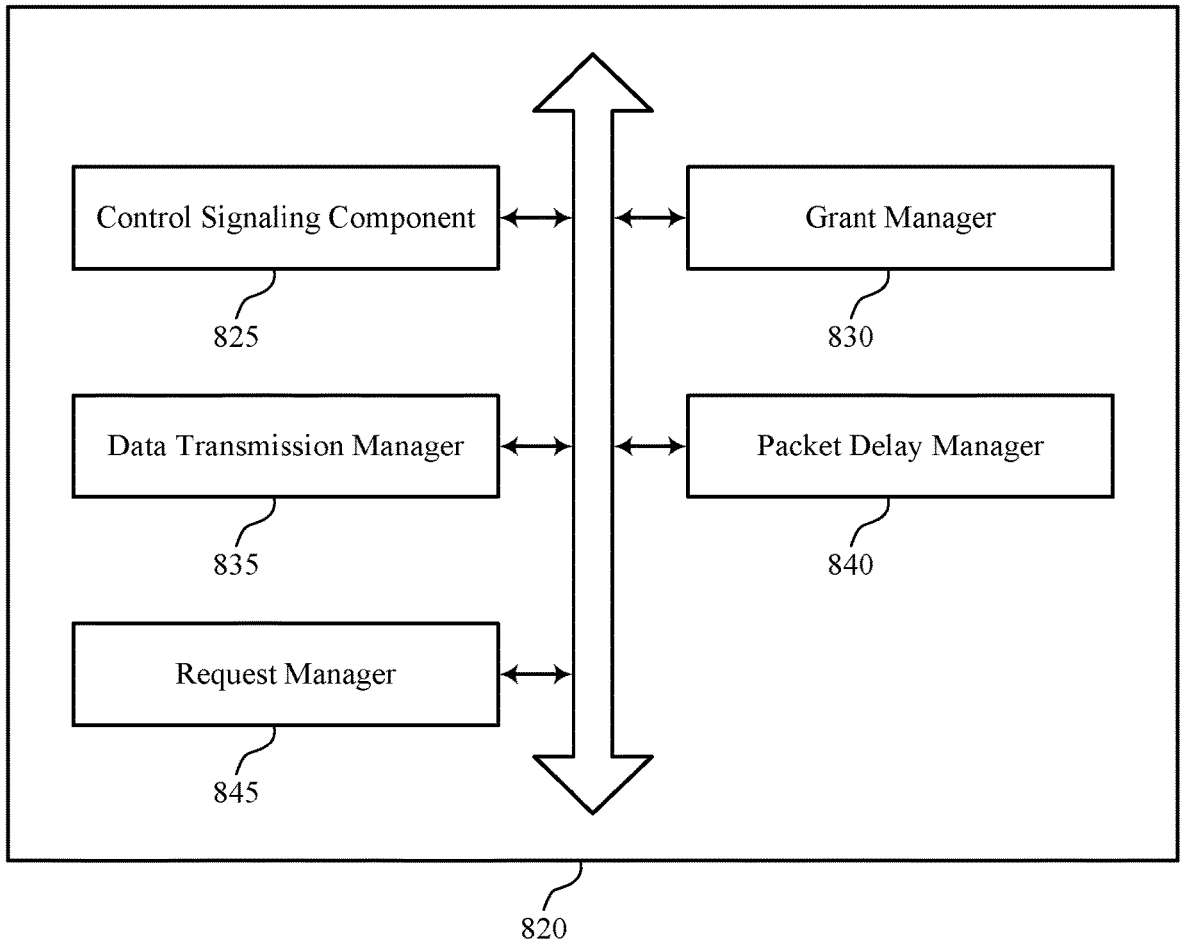
FIG. 8 shows a block diagram of a communications manager that supports techniques for data multiplexing based on packet delay in accordance with one or more aspects of the present disclosure.

FIG. 8 shows a block diagram 800 of a communications manager 820 that supports techniques for data multiplexing based on packet delay in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for data multiplexing based on packet delay as described herein. For example, the communications manager 820 may include a control signaling component 825, a grant manager 830, a data transmission manager 835, a packet delay manager 840, a request manager 845, or any combination thereof. Each of these components may communicate, directly or indirectly, with one another (e.g., via one or more buses).

The communications manager 820 may support wireless communications at a first device in accordance with examples as disclosed herein. The control signaling component 825 may be configured as or otherwise support a means for receiving, from a second device, control signaling indicating a set of parameter values associated with a prioritization procedure for a set of logical channels. The grant manager 830 may be configured as or otherwise support a means for receiving, from the second device, a grant scheduling a transmission of data. The data transmission manager 835 may be configured as or otherwise support a means for transmitting the data to the second device in response to receiving the grant, the data multiplexed according to a parameter value of the set of parameter values, the parameter value based on a packet delay associated with one or more logical channels of the set of logical channels.

In some examples, the control signaling component 825 may be configured as or otherwise support a means for receiving, from the second device, control signaling indicating the parameter value to be used for multiplexing the data corresponding to the set of logical channels, where an amount of data corresponding to a first logical channel of the set of logical channels may be transmitted in response to receiving the control signaling indicating the parameter value.

In some examples, the request manager 845 may be configured as or otherwise support a means for transmitting, to the second device, a parameter modification request, where the control signaling indicating the parameter value may be received in response to transmitting the parameter modification request.

In some examples, the packet delay manager 840 may be configured as or otherwise support a means for determining the packet delay based on a delay prediction, where the data may be transmitted based on determining the packet delay.

In some examples, the control signaling component 825 may be configured as or otherwise support a means for receiving, from the second device, control signaling indicating one or more delay parameters associated with data transmissions, where the delay prediction may be based on the control signaling indicating the one or more delay parameters associated with data transmissions.

In some examples, the delay prediction is based on a current packet delay, a delay deadline, a backhaul delay, a processing delay, or any combination thereof.

In some examples, to support transmitting the data, the data transmission manager 835 may be configured as or otherwise support a means for transmitting the data via a sidelink connection with a third device, where the packet delay may be based on a latency associated with the sidelink connection.

In some examples, the packet delay manager 840 may be configured as or otherwise support a means for determining the packet delay on a per logical channel basis for the set of logical channels, where the data may be transmitted based on determining the packet delay on a per logical channel basis.

In some examples, the control signaling component 825 may be configured as or otherwise support a means for receiving, from the second device, control signaling indicating the one or more logical channels of the set of logical channels, where determining the packet delay on a per logical channel basis may be based on receiving the control signaling indicating the one or more logical channels.

In some examples, the data transmission manager 835 may be configured as or otherwise support a means for adjusting a respective priority of each of the one or more logical channels of the set of logical channels, where the data may be multiplexed based on adjusting the respective priority of each of the one or more logical channels.

In some examples, the packet delay manager 840 may be configured as or otherwise support a means for determining the packet delay based on a machine learning algorithm, where the data may be transmitted based on determining the packet delay.

In some examples, one or more inputs for the machine learning algorithm include one or more traffic delay parameters, a target packet delay, a delay deadline, a packet transmission reliability, one or more statistical parameters associated with the packet delay, or any combination thereof.

In some examples, the data transmission manager 835 may be configured as or otherwise support a means for transmitting, to the second device, signaling indicating the parameter value to be used for multiplexing the data, where the data may be transmitted based on transmitting the signaling indicating the parameter value.

In some examples, the set of parameter values includes a range of parameter values, a set of discrete values, or both.

In some examples, the set of parameter values is associated with a prioritized bit rate, a bucket size duration, a parameter based on the packet delay, a parameter based on an amount of data exceeding a packet delay threshold, a parameter associated with a scheduling bucket size, or any combination thereof.

In some examples, the control signaling is received in a radio resource control message, a downlink control information message, a medium access control control element, or any combination thereof.

Figure 9:
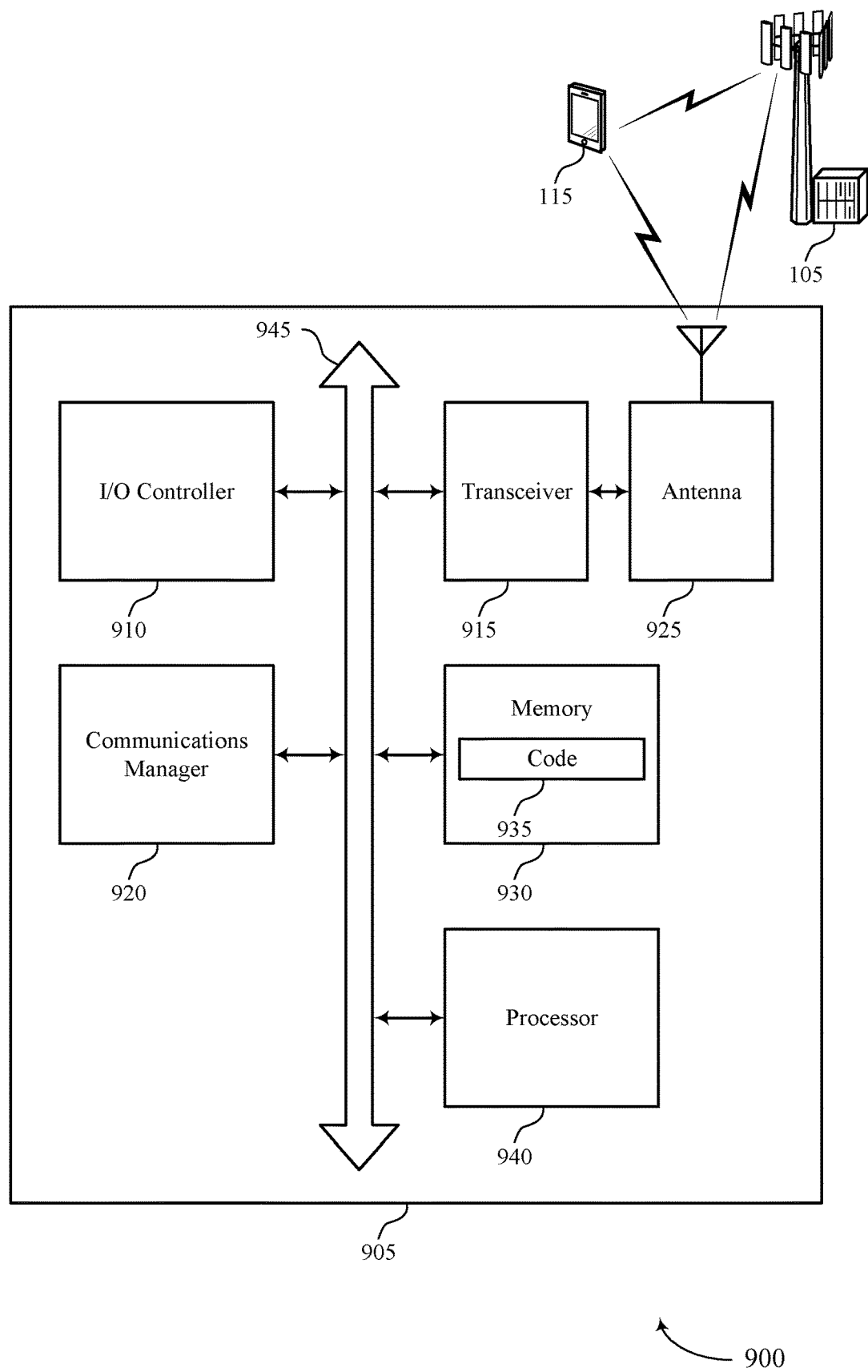
FIG. 9 shows a diagram of a system including a device that supports techniques for data multiplexing based on packet delay in accordance with one or more aspects of the present disclosure.

FIG. 9 shows a diagram of a system 900 including a device 905 that supports techniques for data multiplexing based on packet delay in accordance with one or more aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for data multiplexing based on packet delay). For example, the device 905 or a component of the device 905 may include a processor 940 and memory 930 coupled to the processor 940, the processor 940 and memory 930 configured to perform various functions described herein.

The communications manager 920 may support wireless communications at a first device in accordance with examples as disclosed herein. For example, the communications manager 920 may be configured as or otherwise support a means for receiving, from a second device, control signaling indicating a set of parameter values associated with a prioritization procedure for a set of logical channels. The communications manager 920 may be configured as or otherwise support a means for receiving, from the second device, a grant scheduling a transmission of data. The communications manager 920 may be configured as or otherwise support a means for transmitting the data to the second device in response to receiving the grant, the data multiplexed according to a parameter value of the set of parameter values, the parameter value based on a packet delay associated with one or more logical channels of the set of logical channels.

By including or configuring the communications manager 920 in accordance with examples as described herein, the device 905 may support techniques for saving power by communicating with other devices (e.g., a UE 115 or a base station 105 as shown in FIG. 1) in communications more efficiently. For example, the device 905 may improve reliability in communications with other devices, as the device 905 may be able to reliably multiplex data based on the packet delay. Using the techniques described herein, the device 905 may more accurately transmit multiplexed data, which may improve power efficiency at the device 905.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for data multiplexing based on packet delay as described herein, or the processor 940 and the memory 930 may be otherwise configured to perform or support such operations.

Figure 10:
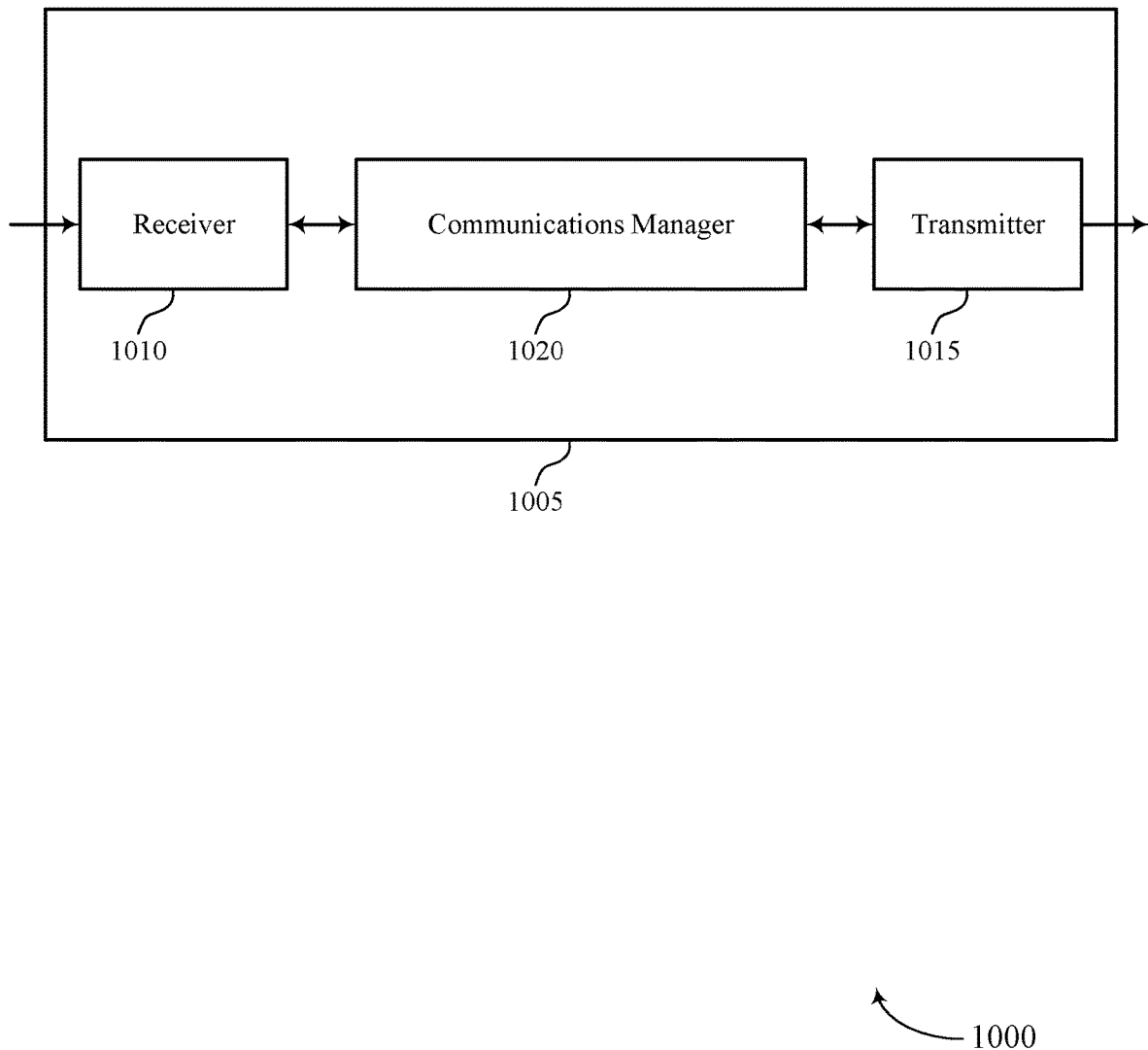
FIGS. 10 and 11 show block diagrams of devices that support techniques for data multiplexing based on packet delay in accordance with one or more aspects of the present disclosure.

FIG. 10 shows a block diagram 1000 of a device 1005 that supports techniques for data multiplexing based on packet delay in accordance with one or more aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for data multiplexing based on packet delay). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for data multiplexing based on packet delay). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for data multiplexing based on packet delay as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a second device in accordance with examples as disclosed herein. For example, the communications manager 1020 may be configured as or otherwise support a means for transmitting, to a first device, control signaling indicating a set of parameter values associated with a prioritization procedure for a set of logical channels at the first device. The communications manager 1020 may be configured as or otherwise support a means for transmitting, to the first device, a grant scheduling a transmission of data. The communications manager 1020 may be configured as or otherwise support a means for receiving the data in response to transmitting the grant, the data multiplexed according to a parameter value of the set of parameter values, the parameter value based on a packet delay associated with one or more logical channels of the set of logical channels.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing, reduced power consumption, more efficient utilization of communication resources, etc.

Figure 11:
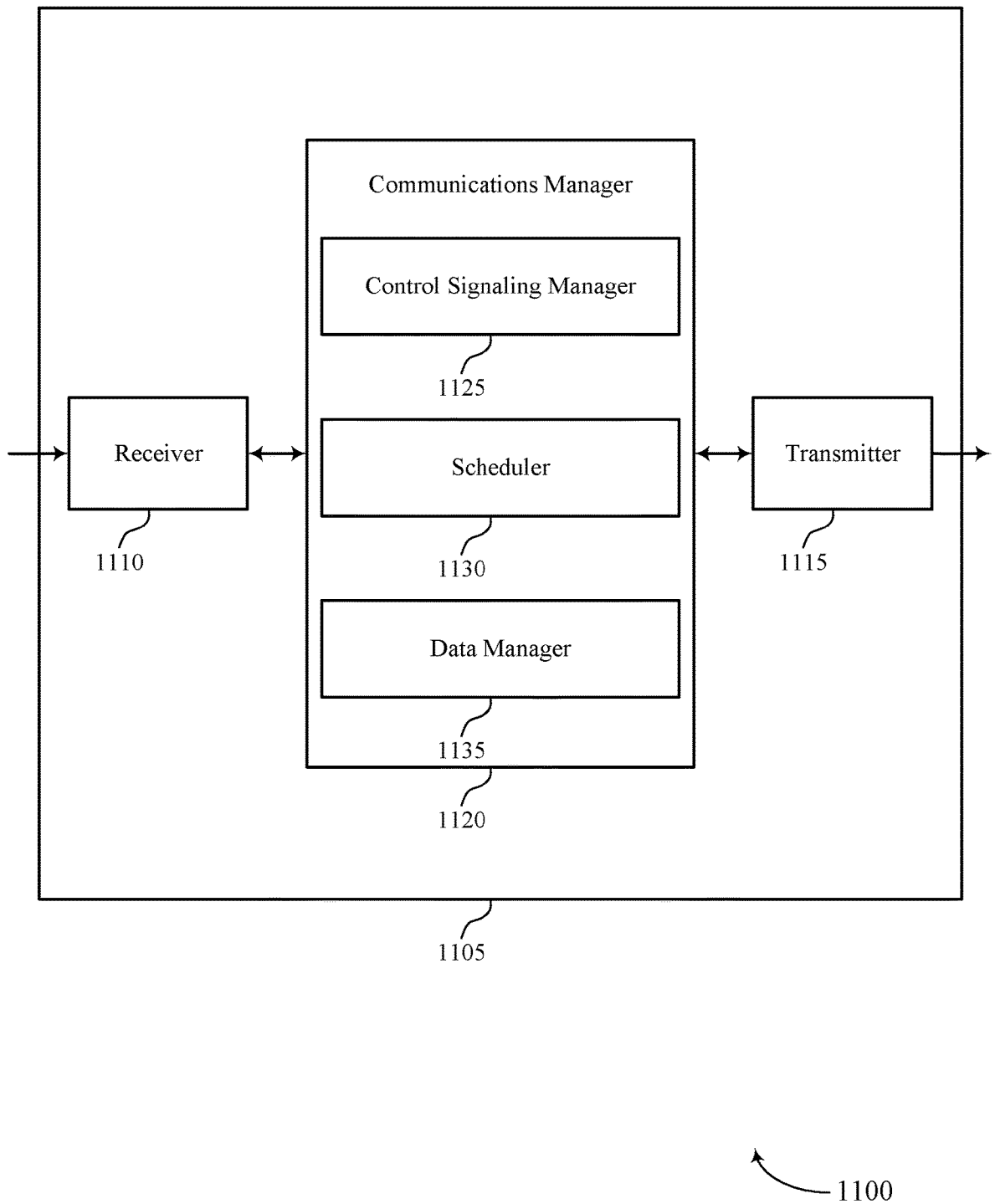

FIG. 11 shows a block diagram 1100 of a device 1105 that supports techniques for data multiplexing based on packet delay in accordance with one or more aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for data multiplexing based on packet delay). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for data multiplexing based on packet delay). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for data multiplexing based on packet delay as described herein. For example, the communications manager 1120 may include a control signaling manager 1125, a scheduler 1130, a data manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a second device in accordance with examples as disclosed herein. The control signaling manager 1125 may be configured as or otherwise support a means for transmitting, to a first device, control signaling indicating a set of parameter values associated with a prioritization procedure for a set of logical channels at the first device. The scheduler 1130 may be configured as or otherwise support a means for transmitting, to the first device, a grant scheduling a transmission of data. The data manager 1135 may be configured as or otherwise support a means for receiving the data in response to transmitting the grant, the data multiplexed according to a parameter value of the set of parameter values, the parameter value based on a packet delay associated with one or more logical channels of the set of logical channels.

Figure 12:
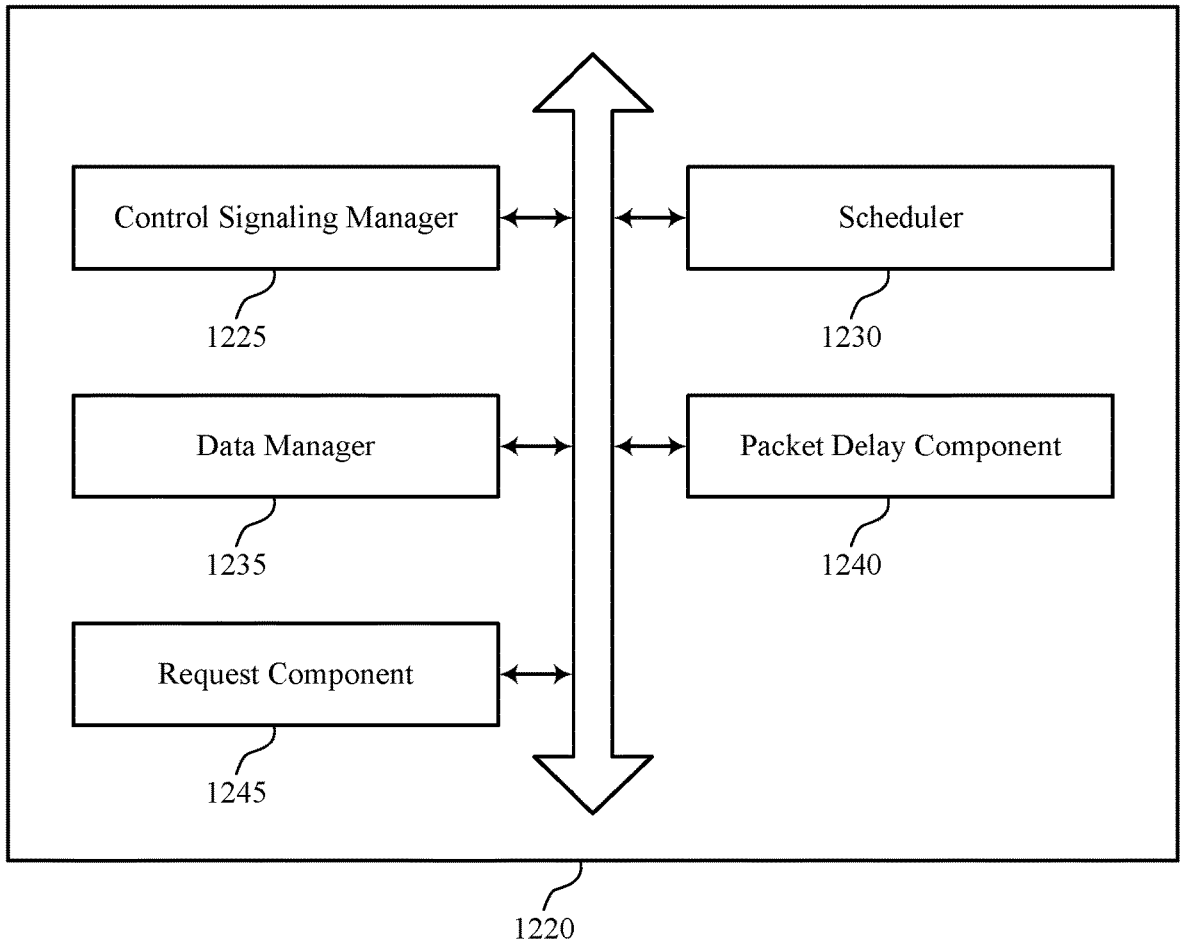
FIG. 12 shows a block diagram of a communications manager that supports techniques for data multiplexing based on packet delay in accordance with one or more aspects of the present disclosure.

FIG. 12 shows a block diagram 1200 of a communications manager 1220 that supports techniques for data multiplexing based on packet delay in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for data multiplexing based on packet delay as described herein. For example, the communications manager 1220 may include a control signaling manager 1225, a scheduler 1230, a data manager 1235, a packet delay component 1240, a request component 1245, or any combination thereof. Each of these components may communicate, directly or indirectly, with one another (e.g., via one or more buses).

The communications manager 1220 may support wireless communications at a second device in accordance with examples as disclosed herein. The control signaling manager 1225 may be configured as or otherwise support a means for transmitting, to a first device, control signaling indicating a set of parameter values associated with a prioritization procedure for a set of logical channels at the first device. The scheduler 1230 may be configured as or otherwise support a means for transmitting, to the first device, a grant scheduling a transmission of data. The data manager 1235 may be configured as or otherwise support a means for receiving the data in response to transmitting the grant, the data multiplexed according to a parameter value of the set of parameter values, the parameter value based on a packet delay associated with one or more logical channels of the set of logical channels.

In some examples, the control signaling manager 1225 may be configured as or otherwise support a means for transmitting, to the first device, control signaling indicating the parameter value to be used for multiplexing the data corresponding to the set of logical channels, where the data may be received in response to transmitting the control signaling indicating the parameter value.

In some examples, the request component 1245 may be configured as or otherwise support a means for receiving, from the first device, a parameter modification request, where the control signaling indicating the parameter value may be transmitted in response to receiving the parameter modification request.

In some examples, the packet delay component 1240 may be configured as or otherwise support a means for determining the packet delay based on a delay prediction, where the delay prediction may be based on one or more delay parameters associated with data transmissions. In some examples, the control signaling manager 1225 may be configured as or otherwise support a means for transmitting, to the first device, control signaling indicating the one or more delay parameters associated with data transmissions, where the data may be received in response to transmitting the control signaling indicating the one or more delay parameters associated with data transmissions.

In some examples, the delay prediction is based on a current packet delay, a delay deadline, a backhaul delay, a processing delay, or any combination thereof.

In some examples, the packet delay component 1240 may be configured as or otherwise support a means for determining the packet delay on a per logical channel basis for the set of logical channels, where the data may be received based on determining the packet delay on a per logical channel basis.

In some examples, the control signaling manager 1225 may be configured as or otherwise support a means for transmitting, to the first device, control signaling indicating the one or more logical channels of the set of logical channels, where determining the packet delay on a per logical channel basis may be based on transmitting the control signaling indicating the one or more logical channels.

In some examples, the packet delay component 1240 may be configured as or otherwise support a means for determining the packet delay based on a machine learning algorithm. In some examples, the control signaling manager 1225 may be configured as or otherwise support a means for transmitting, to the first device, control signaling indicating the packet delay, where the data may be received in response to transmitting the control signaling indicating the packet delay.

In some examples, one or more inputs for the machine learning algorithm include one or more traffic delay parameters, a target packet delay, a delay deadline, a packet transmission reliability, one or more statistical parameters associated with the packet delay, or any combination thereof.

In some examples, the data manager 1235 may be configured as or otherwise support a means for receiving, from the first device, signaling indicating the parameter value to be used for multiplexing the data, where the data may be received based on receiving the signaling indicating the parameter value.

In some examples, the set of parameter values includes a range of parameter values, a set of discrete values, or both.

In some examples, the set of parameter values may be associated with a prioritized bit rate, a bucket size duration, a parameter based on the packet delay, a parameter based on an amount of data exceeding a packet delay threshold, a parameter associated with a scheduling bucket size, or any combination thereof.

Figure 13:
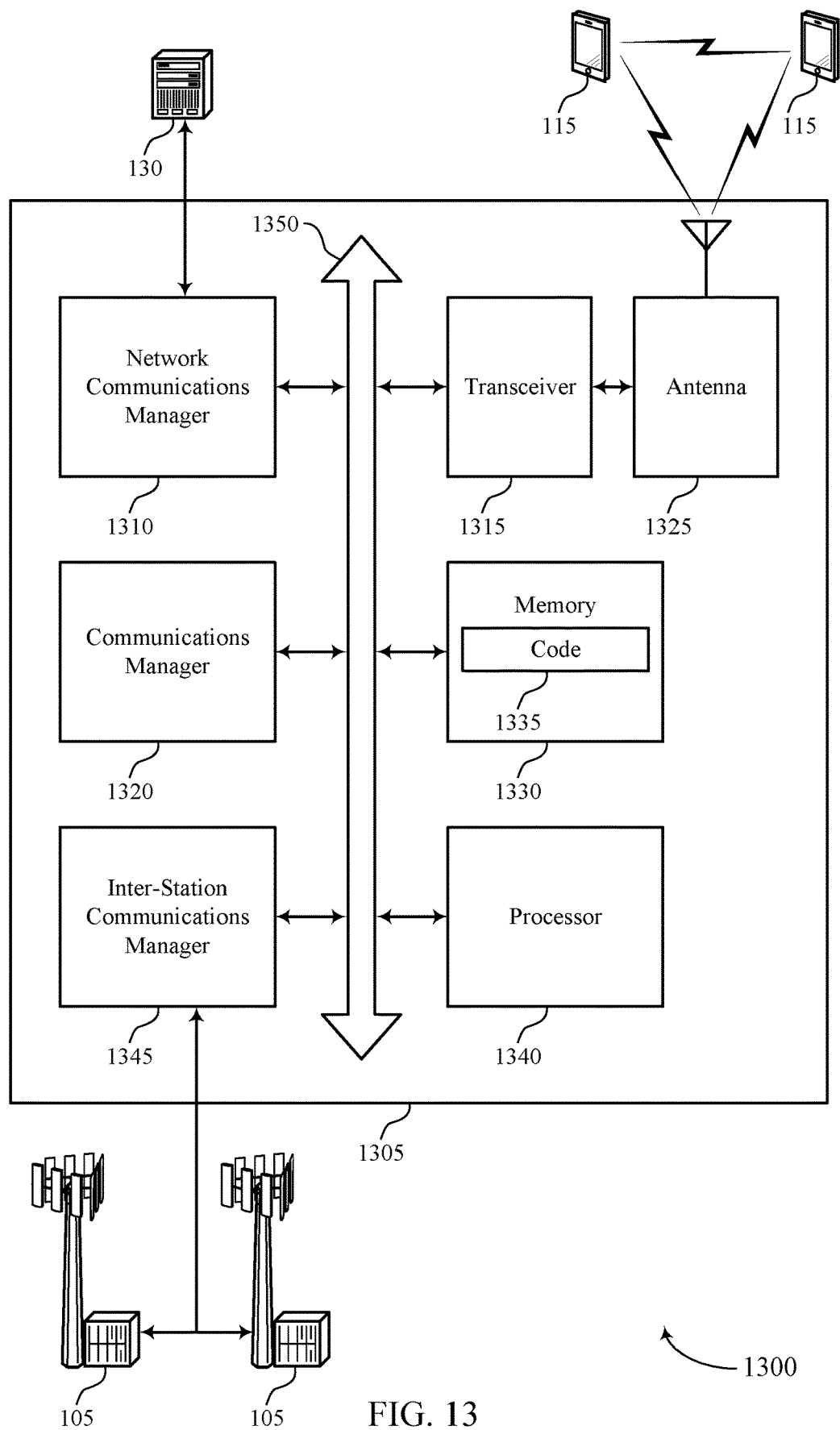
FIG. 13 shows a diagram of a system including a device that supports techniques for data multiplexing based on packet delay in accordance with one or more aspects of the present disclosure.

FIG. 13 shows a diagram of a system 1300 including a device 1305 that supports techniques for data multiplexing based on packet delay in accordance with one or more aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for data multiplexing based on packet delay). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a second device in accordance with examples as disclosed herein. For example, the communications manager 1320 may be configured as or otherwise support a means for transmitting, to a first device, control signaling indicating a set of parameter values associated with a prioritization procedure for a set of logical channels at the first device. The communications manager 1320 may be configured as or otherwise support a means for transmitting, to the first device, a grant scheduling a transmission of data. The communications manager 1320 may be configured as or otherwise support a means for receiving the data in response to transmitting the grant, the data multiplexed according to a parameter value of the set of parameter values, the parameter value based on a packet delay associated with one or more logical channels of the set of logical channels.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, improved utilization of processing capability, etc.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for data multiplexing based on packet delay as described herein, or the processor 1340 and the memory 1330 may be otherwise configured to perform or support such operations.

Figure 14:
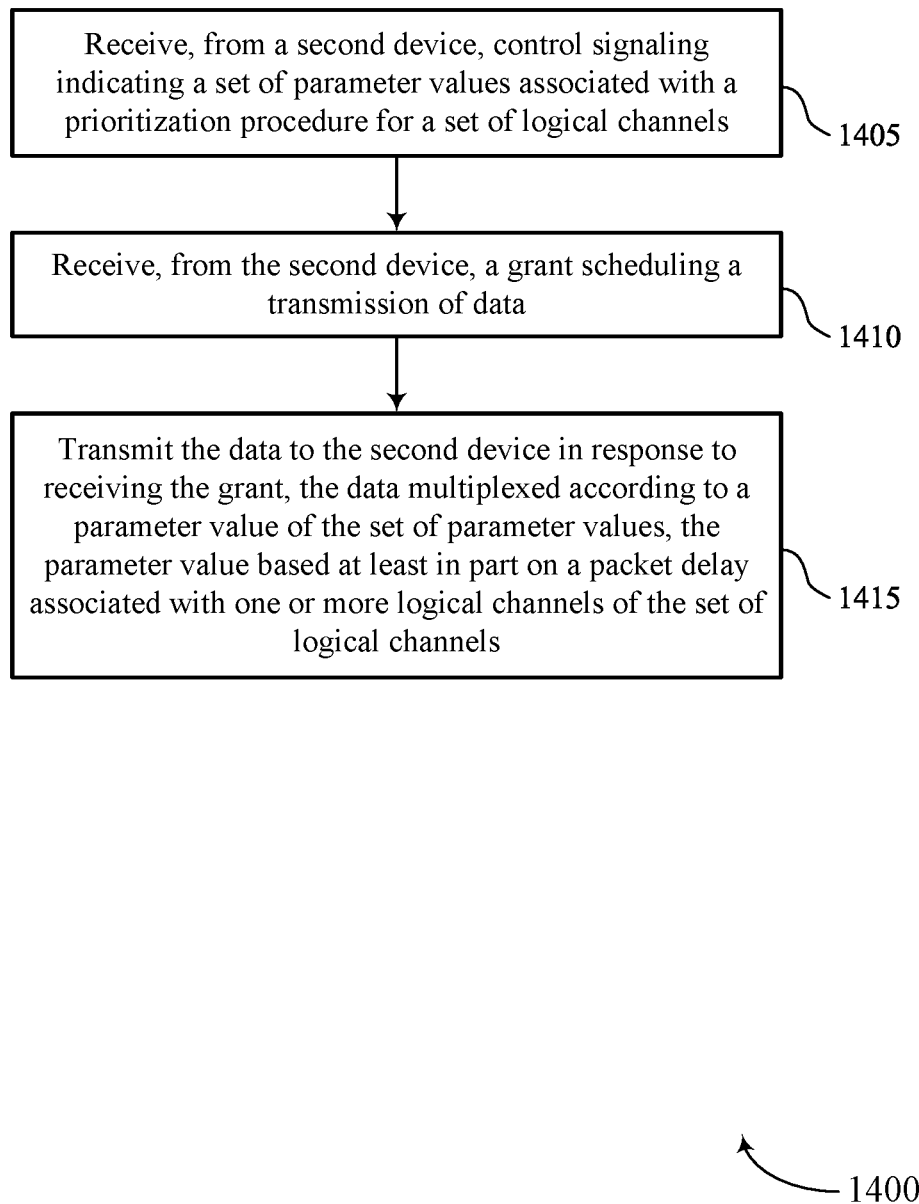
FIGS. 14 through 18 show flowcharts illustrating methods that support techniques for data multiplexing based on packet delay in accordance with one or more aspects of the present disclosure.

FIG. 14 shows a flowchart illustrating a method 1400 that supports techniques for data multiplexing based on packet delay in accordance with one or more aspects of the present disclosure. The operations of the method 1400 may be implemented by a device or its components as described herein. For example, the operations of the method 1400 may be performed by a UE 115 or a base station 105 as described with reference to FIGS. 1 through 13. In some examples, a device may execute a set of instructions to control the functional elements of the device to perform the described functions. Additionally or alternatively, the device may perform one or more aspects of the described functions using special-purpose hardware.

At 1405, the method may include receiving, from a second device, control signaling indicating a set of parameter values associated with a prioritization procedure for a set of logical channels. The operations of 1405 may be performed in accordance with examples as disclosed herein. In some examples, one or more aspects of the operations of 1405 may be performed by a control signaling component 825 as described with reference to FIG. 8.

At 1410, the method may include receiving, from the second device, a grant scheduling a transmission of data. The operations of 1410 may be performed in accordance with examples as disclosed herein. In some examples, one or more aspects of the operations of 1410 may be performed by a grant manager 830 as described with reference to FIG. 8.

At 1415, the method may include transmitting the data to the second device in response to receiving the grant, the data multiplexed according to a parameter value of the set of parameter values, the parameter value based on a packet delay associated with one or more logical channels of the set of logical channels. The operations of 1415 may be performed in accordance with examples as disclosed herein. In some examples, one or more aspects of the operations of 1415 may be performed by a data transmission manager 835 as described with reference to FIG. 8.

Figure 15:
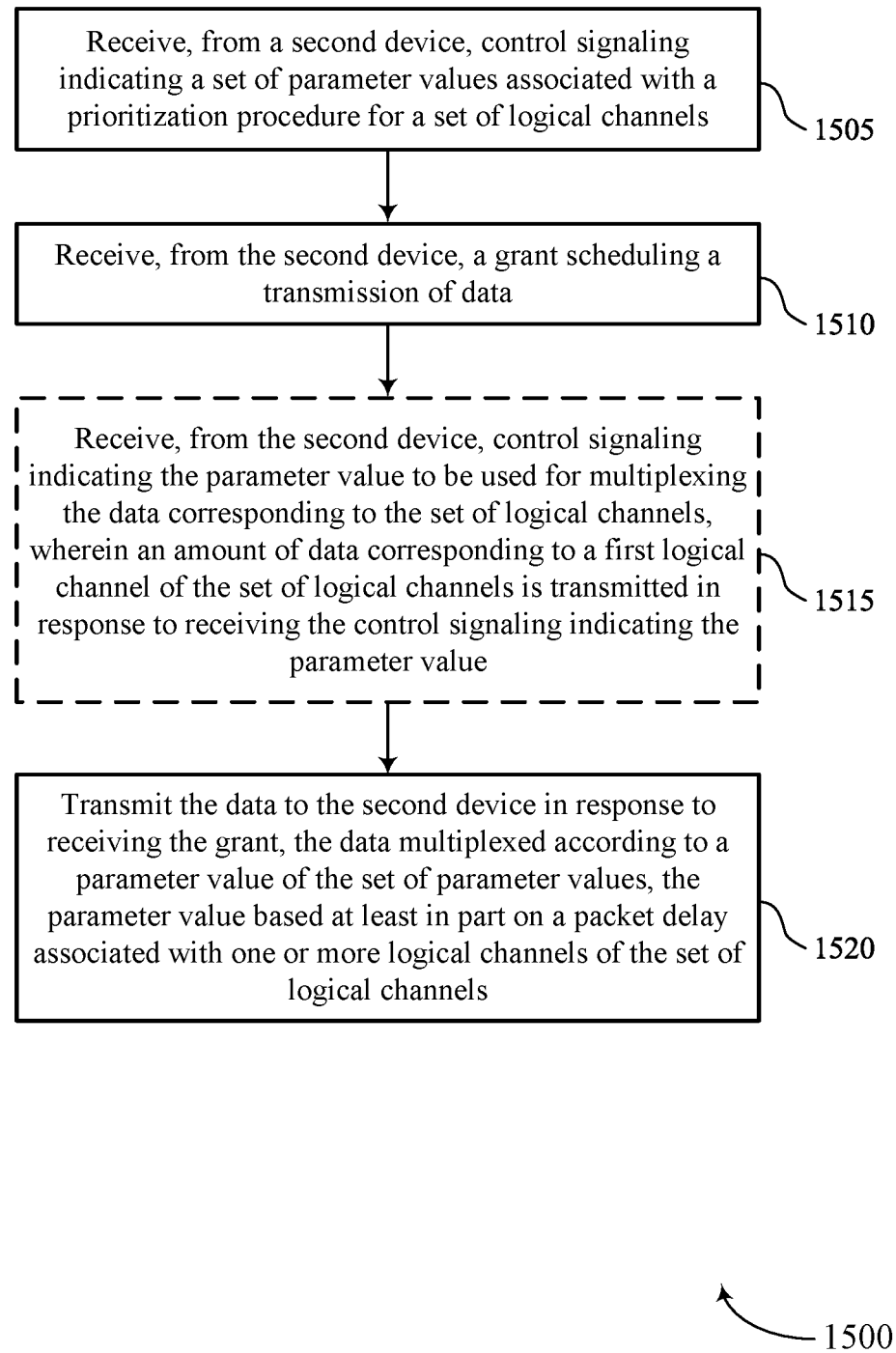

FIG. 15 shows a flowchart illustrating a method 1500 that supports techniques for data multiplexing based on packet delay in accordance with one or more aspects of the present disclosure. The operations of the method 1500 may be implemented by a device or its components as described herein. For example, the operations of the method 1500 may be performed by a UE 115 or a base station 105 as described with reference to FIGS. 1 through 13. In some examples, a device may execute a set of instructions to control the functional elements of the device to perform the described functions. Additionally or alternatively, the device may perform one or more aspects of the described functions using special-purpose hardware.

At 1505, the method may include receiving, from a second device, control signaling indicating a set of parameter values associated with a prioritization procedure for a set of logical channels. The operations of 1505 may be performed in accordance with examples as disclosed herein. In some examples, one or more aspects of the operations of 1505 may be performed by a control signaling component 825 as described with reference to FIG. 8.

At 1510, the method may include receiving, from the second device, a grant scheduling a transmission of data. The operations of 1510 may be performed in accordance with examples as disclosed herein. In some examples, one or more aspects of the operations of 1510 may be performed by a grant manager 830 as described with reference to FIG. 8.

At 1515, the method may include receiving, from the second device, control signaling indicating the parameter value to be used for multiplexing the data corresponding to the set of logical channels, an amount of data corresponding to a first logical channel of the set of logical channels transmitted based on receiving the control signaling indicating the parameter value. The operations of 1515 may be performed in accordance with examples as disclosed herein. In some examples, one or more aspects of the operations of 1515 may be performed by a control signaling component 825 as described with reference to FIG. 8.

At 1520, the method may include transmitting the data to the second device in response to receiving the grant, the data multiplexed according to a parameter value of the set of parameter values, the parameter value based on a packet delay associated with one or more logical channels of the set of logical channels. The operations of 1520 may be performed in accordance with examples as disclosed herein. In some examples, one or more aspects of the operations of 1520 may be performed by a data transmission manager 835 as described with reference to FIG. 8.

Figure 16:
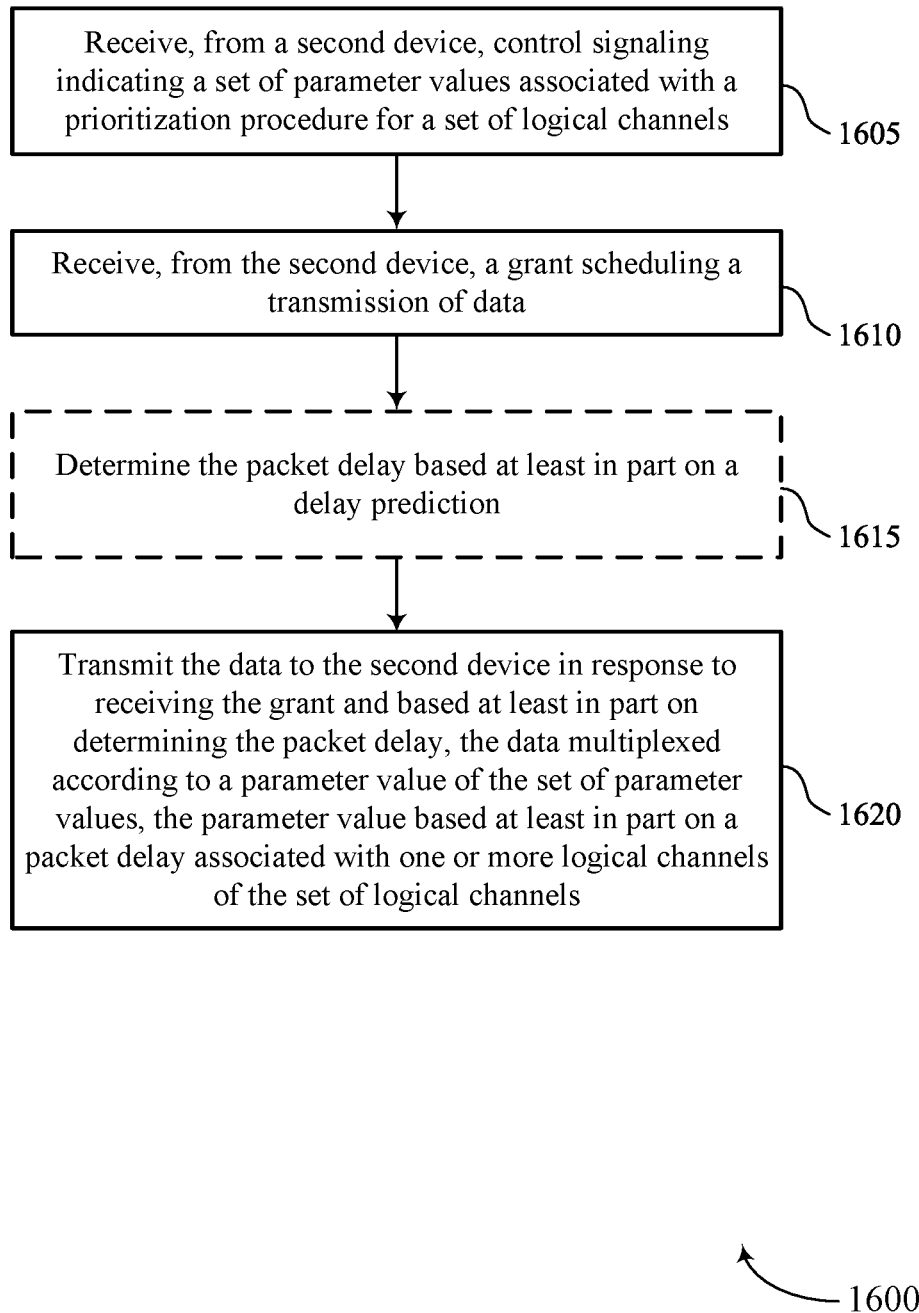

FIG. 16 shows a flowchart illustrating a method 1600 that supports techniques for data multiplexing based on packet delay in accordance with one or more aspects of the present disclosure. The operations of the method 1600 may be implemented by a device or its components as described herein. For example, the operations of the method 1600 may be performed by a UE 115 or a base station 105 as described with reference to FIGS. 1 through 13. In some examples, a device may execute a set of instructions to control the functional elements of the device to perform the described functions. Additionally or alternatively, the device may perform one or more aspects of the described functions using special-purpose hardware.

At 1605, the method may include receiving, from a second device, control signaling indicating a set of parameter values associated with a prioritization procedure for a set of logical channels. The operations of 1605 may be performed in accordance with examples as disclosed herein. In some examples, one or more aspects of the operations of 1605 may be performed by a control signaling component 825 as described with reference to FIG. 8.

At 1610, the method may include receiving, from the second device, a grant scheduling a transmission of data. The operations of 1610 may be performed in accordance with examples as disclosed herein. In some examples, one or more aspects of the operations of 1610 may be performed by a grant manager 830 as described with reference to FIG. 8.

At 1615, the method may include determining the packet delay based on a delay prediction. The operations of 1615 may be performed in accordance with examples as disclosed herein. In some examples, one or more aspects of the operations of 1615 may be performed by a packet delay manager 840 as described with reference to FIG. 8.

At 1620, the method may include transmitting the data to the second device in response to receiving the grant and based on determining the packet delay, the data multiplexed according to a parameter value of the set of parameter values, the parameter value based on a packet delay associated with one or more logical channels of the set of logical channels. The operations of 1620 may be performed in accordance with examples as disclosed herein. In some examples, one or more aspects of the operations of 1620 may be performed by a data transmission manager 835 as described with reference to FIG. 8.

Figure 17:
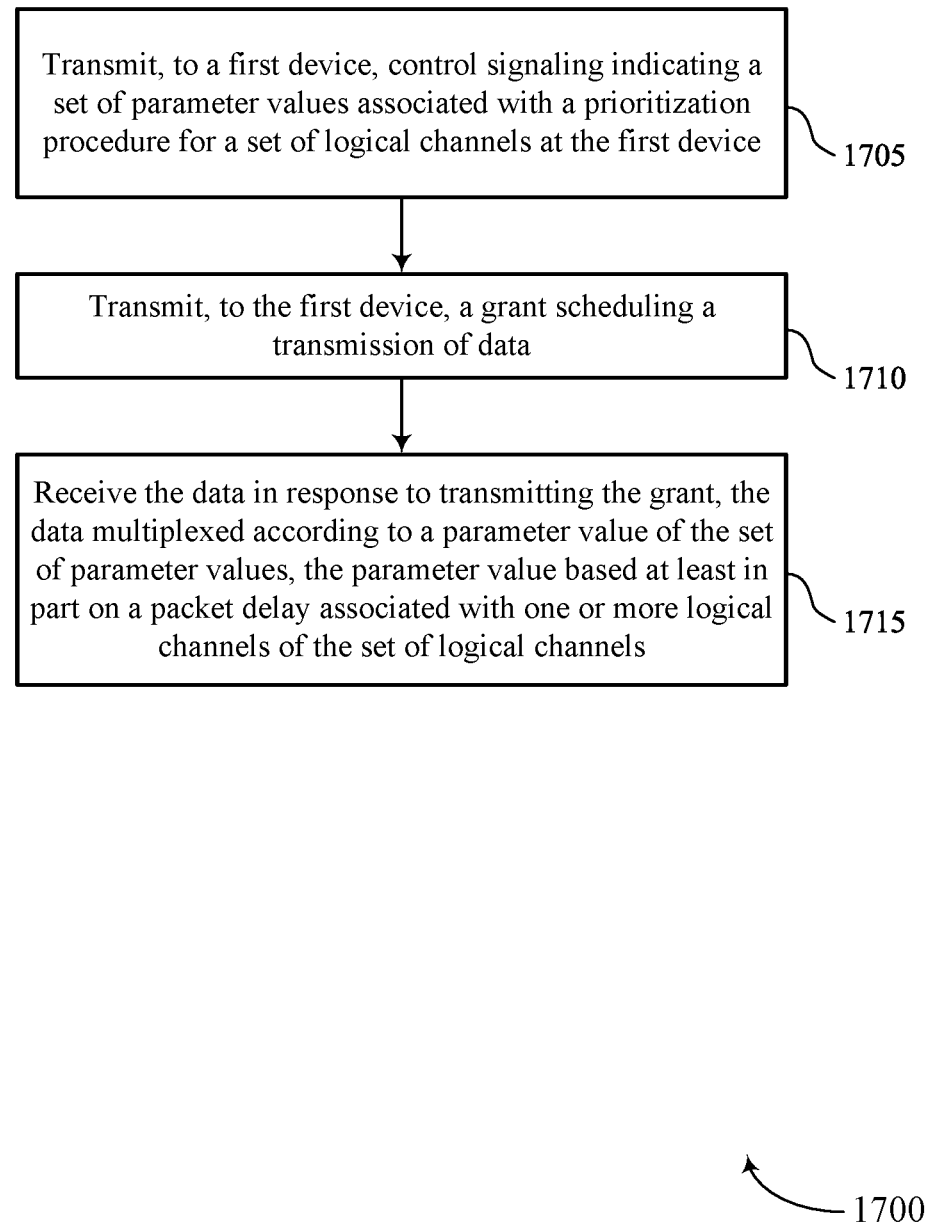

FIG. 17 shows a flowchart illustrating a method 1700 that supports techniques for data multiplexing based on packet delay in accordance with one or more aspects of the present disclosure. The operations of the method 1700 may be implemented by a device or its components as described herein. For example, the operations of the method 1700 may be performed by a UE 115 or a base station 105 as described with reference to FIGS. 1 through 13. In some examples, a device may execute a set of instructions to control the functional elements of the device to perform the described functions. Additionally or alternatively, the device may perform one or more aspects of the described functions using special-purpose hardware.

At 1705, the method may include transmitting, to a first device, control signaling indicating a set of parameter values associated with a prioritization procedure for a set of logical channels at the first device. The operations of 1705 may be performed in accordance with examples as disclosed herein. In some examples, one or more aspects of the operations of 1705 may be performed by a control signaling manager 1225 as described with reference to FIG. 12.

At 1710, the method may include transmitting, to the first device, a grant scheduling a transmission of data. The operations of 1710 may be performed in accordance with examples as disclosed herein. In some examples, one or more aspects of the operations of 1710 may be performed by a scheduler 1230 as described with reference to FIG. 12.

At 1715, the method may include receiving the data in response to transmitting the grant, the data multiplexed according to a parameter value of the set of parameter values, the parameter value based on a packet delay associated with one or more logical channels of the set of logical channels. The operations of 1715 may be performed in accordance with examples as disclosed herein. In some examples, one or more aspects of the operations of 1715 may be performed by a data manager 1235 as described with reference to FIG. 12.

Figure 18:
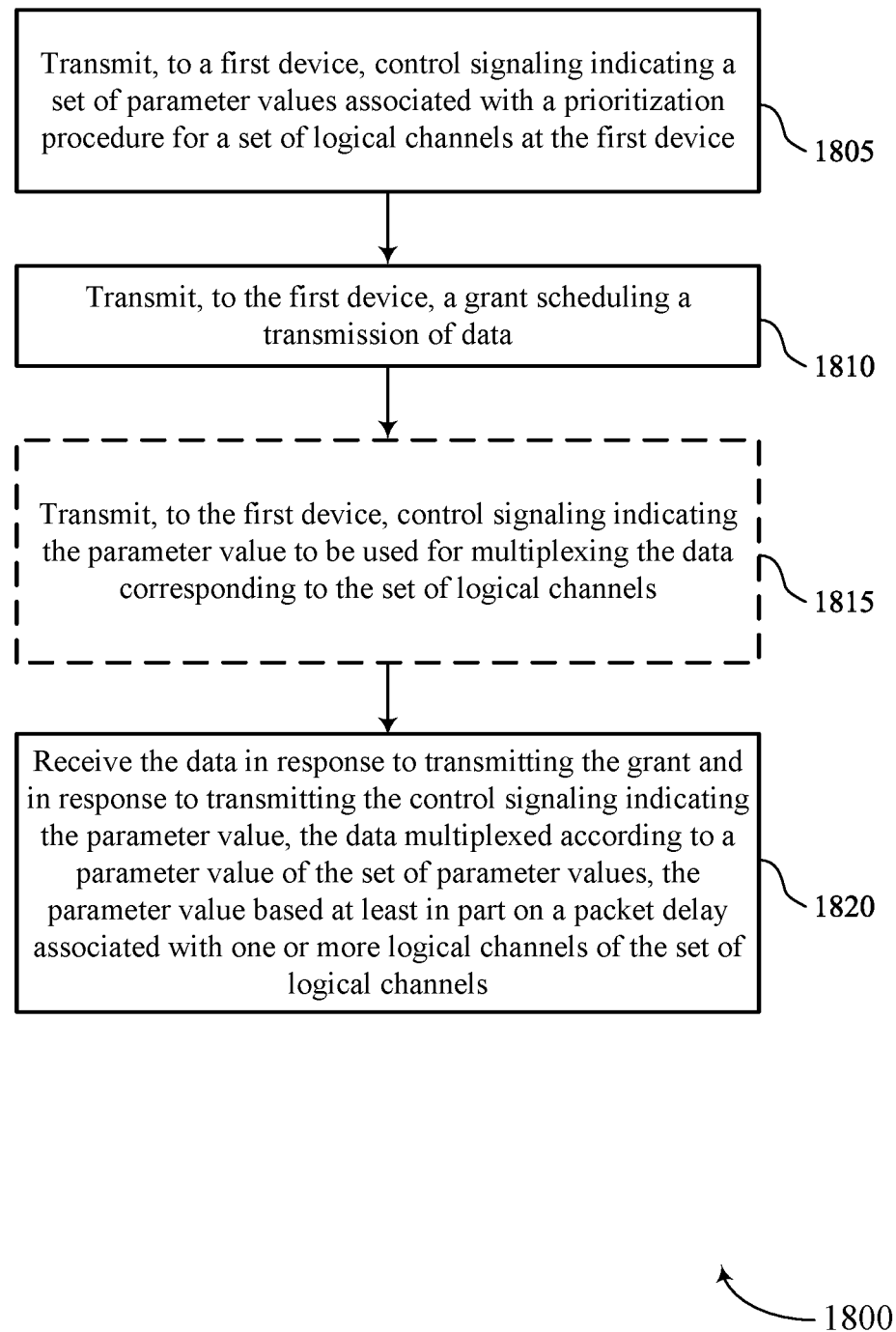

FIG. 18 shows a flowchart illustrating a method 1800 that supports techniques for data multiplexing based on packet delay in accordance with one or more aspects of the present disclosure. The operations of the method 1800 may be implemented by a device or its components as described herein. For example, the operations of the method 1800 may be performed by a UE 115 or a base station 105 as described with reference to FIGS. 1 through 13. In some examples, a device may execute a set of instructions to control the functional elements of the device to perform the described functions. Additionally or alternatively, the device may perform one or more aspects of the described functions using special-purpose hardware.

At 1805, the method may include transmitting, to a first device, control signaling indicating a set of parameter values associated with a prioritization procedure for a set of logical channels at the first device. The operations of 1805 may be performed in accordance with examples as disclosed herein. In some examples, one or more aspects of the operations of 1805 may be performed by a control signaling manager 1225 as described with reference to FIG. 12.

At 1810, the method may include transmitting, to the first device, a grant scheduling a transmission of data. The operations of 1810 may be performed in accordance with examples as disclosed herein. In some examples, one or more aspects of the operations of 1810 may be performed by a scheduler 1230 as described with reference to FIG. 12.

At 1815, the method may include transmitting, to the first device, control signaling indicating the parameter value to be used for multiplexing the data corresponding to the set of logical channels. The operations of 1815 may be performed in accordance with examples as disclosed herein. In some examples, one or more aspects of the operations of 1815 may be performed by a control signaling manager 1225 as described with reference to FIG. 12.

At 1820, the method may include receiving the data in response to transmitting the grant and based on transmitting the control signaling indicating the parameter value, the data multiplexed according to a parameter value of the set of parameter values, the parameter value based on a packet delay associated with one or more logical channels of the set of logical channels. The operations of 1820 may be performed in accordance with examples as disclosed herein. In some examples, one or more aspects of the operations of 1820 may be performed by a data manager 1235 as described with reference to FIG. 12.

The following provides an overview of aspects of the present disclosure:

Aspect 1: A method for wireless communications at a first device, comprising: receiving, from a second device, control signaling indicating a set of parameter values associated with a prioritization procedure for a set of logical channels; receiving, from the second device, a grant scheduling a transmission of data; and transmitting the data to the second device in response to receiving the grant, the data multiplexed according to a parameter value of the set of parameter values, the parameter value based at least in part on a packet delay associated with one or more logical channels of the set of logical channels.

Aspect 2: The method of aspect 1, further comprising: receiving, from the second device, control signaling indicating the parameter value to be used for multiplexing the data corresponding to the set of logical channels, wherein an amount of data corresponding to a first logical channel of the set of logical channels is transmitted in response to receiving the control signaling indicating the parameter value.

Aspect 3: The method of aspect 2, further comprising: transmitting, to the second device, a parameter modification request, wherein the control signaling indicating the parameter value is received in response to transmitting the parameter modification request.

Aspect 4: The method of any of aspects 1 through 3, further comprising: determining the packet delay based at least in part on a delay prediction, wherein the data is transmitted based at least in part on determining the packet delay.

Aspect 5: The method of aspect 4, further comprising: receiving, from the second device, control signaling indicating one or more delay parameters associated with data transmissions, wherein the delay prediction is based at least in part on the control signaling indicating the one or more delay parameters associated with data transmissions.

Aspect 6: The method of any of aspects 4 through 5, wherein the delay prediction is based at least in part on a current packet delay, a delay deadline, a backhaul delay, a processing delay, or any combination thereof.

Aspect 7: The method of any of aspects 1 through 6, wherein transmitting the data further comprises: transmitting the data via a sidelink connection with a third device, wherein the packet delay is based at least in part on a latency associated with the sidelink connection.

Aspect 8: The method of any of aspects 1 through 7, further comprising: determining the packet delay on a per logical channel basis for the set of logical channels, wherein the data is transmitted based at least in part on determining the packet delay on a per logical channel basis.

Aspect 9: The method of aspect 8, further comprising: receiving, from the second device, control signaling indicating the one or more logical channels of the set of logical channels, wherein determining the packet delay on a per logical channel basis is based at least in part on receiving the control signaling indicating the one or more logical channels.

Aspect 10: The method of any of aspects 8 through 9, further comprising: adjusting a respective priority of each of the one or more logical channels of the set of logical channels, wherein the data is multiplexed based at least in part on adjusting the respective priority of each of the one or more logical channels.

Aspect 11: The method of any of aspects 1 through 10, further comprising: determining the packet delay based at least in part on a machine learning algorithm, wherein the data is transmitted based at least in part on determining the packet delay.

Aspect 12: The method of aspect 11, wherein one or more inputs for the machine learning algorithm comprise one or more traffic delay parameters, a target packet delay, a delay deadline, a packet transmission reliability, one or more statistical parameters associated with the packet delay, or any combination thereof.

Aspect 13: The method of any of aspects 1 through 12, further comprising: transmitting, to the second device, signaling indicating the parameter value to be used for multiplexing the data, wherein the data is transmitted based at least in part on transmitting the signaling indicating the parameter value.

Aspect 14: The method of any of aspects 1 through 13, wherein the set of parameter values comprises a range of parameter values, a set of discrete values, or both.

Aspect 15: The method of any of aspects 1 through 14, wherein the set of parameter values is associated with a prioritized bit rate, a bucket size duration, a parameter based at least in part on the packet delay, a parameter based at least in part on an amount of data exceeding a packet delay threshold, a parameter associated with a scheduling bucket size, or any combination thereof.

Aspect 16: The method of any of aspects 1 through 15, wherein the control signaling is received in a radio resource control message, a downlink control information message, a medium access control control element, or any combination thereof.

Aspect 17: A method for wireless communications at a second device, comprising: transmitting, to a first device, control signaling indicating a set of parameter values associated with a prioritization procedure for a set of logical channels at the first device; transmitting, to the first device, a grant scheduling a transmission of data; and receiving the data in response to transmitting the grant, the data multiplexed according to a parameter value of the set of parameter values, the parameter value based at least in part on a packet delay associated with one or more logical channels of the set of logical channels.

Aspect 18: The method of aspect 17, further comprising: transmitting, to the first device, control signaling indicating the parameter value to be used for multiplexing the data corresponding to the set of logical channels, wherein the data is received in response to transmitting the control signaling indicating the parameter value.

Aspect 19: The method of aspect 18, further comprising: receiving, from the first device, a parameter modification request, wherein the control signaling indicating the parameter value is transmitted in response to receiving the parameter modification request.

Aspect 20: The method of any of aspects 17 through 19, further comprising: determining the packet delay based at least in part on a delay prediction, wherein the delay prediction is based at least in part on one or more delay parameters associated with data transmissions; and transmitting, to the first device, control signaling indicating the one or more delay parameters associated with data transmissions, wherein the data is received in response to transmitting the control signaling indicating the one or more delay parameters associated with data transmissions.

Aspect 21: The method of aspect 20, wherein the delay prediction is based at least in part on a current packet delay, a delay deadline, a backhaul delay, a processing delay, or any combination thereof.

Aspect 22: The method of any of aspects 17 through 21, further comprising: determining the packet delay on a per logical channel basis for the set of logical channels, wherein the data is received based at least in part on determining the packet delay on a per logical channel basis.

Aspect 23: The method of aspect 22, further comprising: transmitting, to the first device, control signaling indicating the one or more logical channels of the set of logical channels, wherein determining the packet delay on a per logical channel basis is based at least in part on transmitting the control signaling indicating the one or more logical channels.

Aspect 24: The method of any of aspects 17 through 23, further comprising: determining the packet delay based at least in part on a machine learning algorithm; and transmitting, to the first device, control signaling indicating the packet delay, wherein the data is received in response to transmitting the control signaling indicating the packet delay.

Aspect 25: The method of aspect 24, wherein one or more inputs for the machine learning algorithm comprise one or more traffic delay parameters, a target packet delay, a delay deadline, a packet transmission reliability, one or more statistical parameters associated with the packet delay, or any combination thereof.

Aspect 26: The method of any of aspects 17 through 25, further comprising: receiving, from the first device, signaling indicating the parameter value to be used for multiplexing the data, wherein the data is received based at least in part on receiving the signaling indicating the parameter value.

Aspect 27: The method of any of aspects 17 through 26, wherein the set of parameter values comprises a range of parameter values, a set of discrete values, or both.

Aspect 28: The method of any of aspects 17 through 27, wherein the set of parameter values is associated with a prioritized bit rate, a bucket size duration, a parameter based at least in part on the packet delay, a parameter based at least in part on an amount of data exceeding a packet delay threshold, a parameter associated with a scheduling bucket size, or any combination thereof.

Aspect 29: An apparatus for wireless communications at a first device, comprising a processor; memory coupled with the processor; and instructions stored in the memory and executable by the processor to cause the apparatus to perform a method of any of aspects 1 through 16.

Aspect 30: An apparatus for wireless communications at a first device, comprising at least one means for performing a method of any of aspects 1 through 16.

Aspect 31: A non-transitory computer-readable medium storing code for wireless communications at a first device, the code comprising instructions executable by a processor to perform a method of any of aspects 1 through 16.

Aspect 32: An apparatus for wireless communications at a second device, comprising a processor; memory coupled with the processor; and instructions stored in the memory and executable by the processor to cause the apparatus to perform a method of any of aspects 17 through 28.

Aspect 33: An apparatus for wireless communications at a second device, comprising at least one means for performing a method of any of aspects 17 through 28.

Aspect 34: A non-transitory computer-readable medium storing code for wireless communications at a second device, the code comprising instructions executable by a processor to perform a method of any of aspects 17 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first device, comprising:
   one or more memories; and
   one or more processors coupled with the one or more memories and configured to cause the first device to:
   receive, from a second device, control signaling that indicates a set of parameter values associated with a prioritization procedure for a set of logical channels;
   receive, from the second device, a grant that schedules a transmission of data; and
   transmit the data to the second device in accordance with the grant, the data corresponding to the set of logical channels and multiplexed, for transmission, in accordance with a parameter value of the set of parameter values, the parameter value based at least in part on a packet delay associated with one or more logical channels of the set of logical channels, the packet delay determined based at least in part on a delay prediction.

2. The apparatus of claim 1, wherein the one or more processors are configured to cause the first device to:
   receive, from the second device, second control signaling that indicates the parameter value to be used to multiplex the data that corresponds to the set of logical channels, wherein an amount of data that corresponds to a first logical channel of the set of logical channels is transmitted in response to receipt of the second control signaling that indicates the parameter value.

3. The apparatus of claim 2, wherein the one or more processors are configured to cause the first device to:
   transmit, to the second device, a parameter modification request, wherein the second control signaling that indicates the parameter value is received in response to transmission of the parameter modification request.

4. The apparatus of claim 1, wherein the one or more processors are configured to cause the first device to:
   receive, from the second device, second control signaling that indicates one or more delay parameters associated with data transmissions, wherein the delay prediction is based at least in part on the second control signaling that indicates the one or more delay parameters associated with data transmissions.

5. The apparatus of claim 1, wherein the delay prediction is based at least in part on a current packet delay, a delay deadline, a backhaul delay, a processing delay, or any combination thereof.

6. The apparatus of claim 1, wherein, to transmit the data, the one or more processors are configured to cause the first device to:
   transmit the data via a sidelink connection with a third device, wherein the packet delay is based at least in part on a latency associated with the sidelink connection.

7. The apparatus of claim 1, wherein the one or more processors are configured to cause the first device to:
   determine the packet delay on a per logical channel basis for the set of logical channels, wherein the data is transmitted based at least in part on determination of the packet delay on the per logical channel basis.

8. The apparatus of claim 7, wherein the one or more processors are configured to cause the first device to:
   receive, from the second device, second control signaling that indicates the one or more logical channels of the set of logical channels, wherein the determination of the packet delay on the per logical channel basis is based at least in part on receipt of the second control signaling that indicates the one or more logical channels.

9. The apparatus of claim 7, wherein the one or more processors are configured to cause the first device to:
   adjust a respective priority of each of the one or more logical channels of the set of logical channels, wherein the data is multiplexed based at least in part on adjustment of the respective priority of each of the one or more logical channels.

10. The apparatus of claim 1, wherein the one or more processors are configured to cause the first device to:
    determine the packet delay based at least in part on a machine learning algorithm, wherein the data is transmitted based at least in part on determination of the packet delay.

11. The apparatus of claim 10, wherein one or more inputs for the machine learning algorithm comprise one or more traffic delay parameters, a target packet delay, a delay deadline, a packet transmission reliability, one or more statistical parameters associated with the packet delay, or any combination thereof.

12. The apparatus of claim 1, wherein the one or more processors are configured to cause the first device to:
    transmit, to the second device, signaling that indicates the parameter value to be used to multiplex the data, wherein the data is transmitted based at least in part on transmission of the signaling that indicates the parameter value.

13. The apparatus of claim 1, wherein the set of parameter values comprises a range of parameter values, a set of discrete values, or both.

14. The apparatus of claim 1, wherein the set of parameter values is associated with a prioritized bit rate, a bucket size duration, a parameter based at least in part on the packet delay, a parameter based at least in part on an amount of data exceeding a packet delay threshold, a parameter associated with a scheduling bucket size, or any combination thereof.

15. The apparatus of claim 1, further comprising:
an antenna array operable to receive the control signaling or the grant, or to transmit the data, or both.

16. An apparatus for wireless communications at a second device, comprising:
one or more memories; and
one or more processors coupled with the one or more memories and configured to cause the second device to:
transmit, to a first device, control signaling that indicates a set of parameter values associated with a prioritization procedure for a set of logical channels at the first device;
transmit, to the first device, a grant that schedules a transmission of data; and
receive the data in accordance with the grant, the data corresponding to the set of logical channels and multiplexed for transmission, in accordance with a parameter value of the set of parameter values, the parameter value based at least in part on a packet delay associated with one or more logical channels of the set of logical channels, the packet delay determined based at least in part on a delay prediction.

17. The apparatus of claim 16, wherein the one or more processors are configured to cause the second device to:
transmit, to the first device, second control signaling that indicates the parameter value to be used to multiplex the data that corresponds to the set of logical channels, wherein the data is received in response to transmission of the second control signaling that indicates the parameter value.

18. The apparatus of claim 17, wherein the one or more processors are configured to cause the second device to:
receive, from the first device, a parameter modification request, wherein the second control signaling that indicates the parameter value is transmitted in response to receipt of the parameter modification request.

19. The apparatus of claim 16, wherein the delay prediction is based at least in part on one or more delay parameters associated with data transmissions, wherein the one or more processors are configured to cause the second device to:
transmit, to the first device, second control signaling that indicates the one or more delay parameters associated with data transmissions, wherein the data is received in response to transmission of the second control signaling that indicates the one or more delay parameters associated with data transmissions.

20. The apparatus of claim 16, wherein the delay prediction is based at least in part on a current packet delay, a delay deadline, a backhaul delay, a processing delay, or any combination thereof.

21. The apparatus of claim 16, wherein the one or more processors are configured to cause the second device to:
determine the packet delay on a per logical channel basis for the set of logical channels, wherein the data is received based at least in part on determination of the packet delay on the per logical channel basis.

22. The apparatus of claim 21, wherein the one or more processors are configured to cause the second device to:
transmit, to the first device, second control signaling that indicates the one or more logical channels of the set of logical channels, wherein the determination of the packet delay on the per logical channel basis is based at least in part on transmission of the second control signaling that indicates the one or more logical channels.

23. The apparatus of claim 16, wherein the one or more processors are configured to cause the second device to:
determine the packet delay based at least in part on a machine learning algorithm; and
transmit, to the first device, second control signaling that indicates the packet delay, wherein the data is received in response to transmission of the control signaling that indicates the packet delay.

24. The apparatus of claim 23, wherein one or more inputs for the machine learning algorithm comprise one or more traffic delay parameters, a target packet delay, a delay deadline, a packet transmission reliability, one or more statistical parameters associated with the packet delay, or any combination thereof.

25. The apparatus of claim 16, wherein the one or more processors are configured to cause the second device to:
receive, from the first device, signaling that indicates the parameter value to be used to multiplex the data, wherein the data is received based at least in part on receipt of the signaling that indicates the parameter value.

26. The apparatus of claim 16, wherein the set of parameter values comprises a range of parameter values, a set of discrete values, or both.

27. The apparatus of claim 16, further comprising:
an antenna array operable to transmit the control signaling or the grant, or to receive the data, or both.

28. A method for wireless communications at a first device, comprising:
receiving, from a second device, control signaling that indicates a set of parameter values associated with a prioritization procedure for a set of logical channels;
receiving, from the second device, a grant that schedules a transmission of data; and
transmitting the data to the second device in accordance with the grant, the data corresponding to the set of logical channels and multiplexed, for transmission, in accordance with a parameter value of the set of parameter values, the parameter value based at least in part on a packet delay associated with one or more logical channels of the set of logical channels, the packet delay determined based at least in part on a delay prediction.

29. The method of claim 28, further comprising:
receiving, from the second device, second control signaling that indicates the parameter value to be used to multiplex the data that corresponds to the set of logical channels, wherein an amount of data that corresponds to a first logical channel of the set of logical channels is transmitted in response to receipt of the second control signaling that indicates the parameter value.

30. The method of claim 29, further comprising:
transmitting, to the second device, a parameter modification request, wherein the second control signaling that indicates the parameter value is received in response to transmission of the parameter modification request.

31. The method of claim 28, further comprising:
determining the packet delay on a per logical channel basis for the set of logical channels, wherein the data is transmitted based at least in part on determination of the packet delay on the per logical channel basis.

32. The method of claim 31, further comprising:
adjusting respective priority of each of the one or more logical channels of the set of logical channels, wherein the data is multiplexed based at least in part on adjustment of the respective priority of each of the one or more logical channels.

33. The method of claim 28, further comprising:
transmitting, to the first device, second control signaling that indicates the parameter value to be used to multiplex the data that corresponds to the set of logical channels, wherein the data is received in response to transmission of the second control signaling that indicates the parameter value.

34. The method of claim 33, further comprising:
receiving, from the first device, a parameter modification request, wherein the second control signaling that indicates the parameter value is transmitted in response to receipt of the parameter modification request.

35. The method of claim 28, further comprising:
determine the packet delay on a per logical channel basis for the set of logical channels, wherein the data is received based at least in part on determination of the packet delay on the per logical channel basis.

36. The method of claim 35, further comprising:
receiving, from the second device, second control signaling that indicates the one or more logical channels of the set of logical channels, wherein the determination of the packet delay on the per logical channel basis is based at least in part on receipt of the second control signaling that indicates the one or more logical channels.

37. A method for wireless communications at a second device, comprising:
transmitting, to a first device, control signaling that indicates a set of parameter values associated with a prioritization procedure for a set of logical channels at the second device;
transmitting, to the first device, a grant that schedules a transmission of data; and
receiving the data in accordance with the grant, the data corresponding to the set of logical channels and multiplexed, for transmission, in accordance with a parameter value of the set of parameter values, the parameter value based at least in part on a packet delay associated with one or more logical channels of the set of logical channels, the packet delay determined based at least in part on a delay prediction.

38. The method of claim 37, further comprising:
transmitting, to the first device, second control signaling that indicates the parameter value to be used to multiplex the data that corresponds to the set of logical channels, wherein the data is received in response to transmission of the second control signaling that indicates the parameter value.

39. The method of claim 38, further comprising:
receiving, from the first device, a parameter modification request, wherein the second control signaling that indicates the parameter value is transmitted in response to receipt of the parameter modification request.

40. The method of claim 37, wherein the delay prediction is based at least in part on one or more delay parameters associated with data transmissions, the method further comprising:
transmitting, to the first device, second control signaling that indicates the one or more delay parameters associated with data transmissions, wherein the data is received in response to transmission of the second control signaling that indicates the one or more delay parameters associated with data transmissions.

41. The method of claim 37, further comprising:
receive, from the first device, signaling that indicates the parameter value to be used to multiplex the data, wherein the data is received based at least in part on receipt of the signaling that indicates the parameter value.

42. A non-transitory computer-readable medium storing code for wireless communication at a first device, the code comprising instructions executable by a one or more processors to cause the first device to:
receive, from a second device, control signaling that indicates a set of parameter values associated with a prioritization procedure for a set of logical channels;
receive, from the second device, a grant that schedules a transmission of data; and
transmit the data to the second device in accordance with the grant, the data corresponding to the set of logical channels and multiplexed, for transmission, in accordance with a parameter value of the set of parameter values, the parameter value based at least in part on a packet delay associated with one or more logical channels of the set of logical channels, the packet delay determined based at least in part on a delay prediction.

43. A non-transitory computer-readable medium storing code for wireless communication at a second device, the code comprising instructions executable by a one or more processors to cause the second device to:
transmit, to a first device, control signaling that indicates a set of parameter values associated with a prioritization procedure for a set of logical channels at the first device;
transmit, to the first device, a grant that schedules a transmission of data; and
receive the data in accordance with the grant, the data corresponding to the set of logical channels and multiplexed, for transmission, in accordance with a parameter value of the set of parameter values, the parameter value based at least in part on a packet delay associated with one or more logical channels of the set of logical channels, the packet delay determined based at least in part on a delay prediction.

* * * * *